(12) United States Patent
Hinghole et al.

(10) Patent No.: US 8,560,447 B1
(45) Date of Patent: Oct. 15, 2013

(54) INTELLIGENT ACCOUNT SELECTION FOR ELECTRONIC BILL PAYMENT

(75) Inventors: Shailesh J. Hinghole, Mountain View, CA (US); LennaRani Chittineni, Sunnyvale, CA (US); Suresh R. Rao, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 20 days.

(21) Appl. No.: 13/192,228

(22) Filed: Jul. 27, 2011

(51) Int. Cl.
*G06Q 40/00* (2012.01)

(52) U.S. Cl.
USPC .................................. 705/40; 705/35; 705/39

(58) Field of Classification Search
USPC ...................................................... 705/35, 39
See application file for complete search history.

(56) References Cited

U.S. PATENT DOCUMENTS

| | | | |
|---|---|---|---|
| 7,890,405 B1 | 2/2011 | Robb | |
| 7,958,049 B2 | 6/2011 | Jamison et al. | |
| 2002/0069122 A1* | 6/2002 | Yun et al. | 705/26 |
| 2003/0229585 A1 | 12/2003 | Butler | |
| 2004/0143546 A1 | 7/2004 | Wood et al. | |
| 2008/0101041 A1* | 5/2008 | Chang et al. | 361/728 |
| 2008/0275816 A1 | 11/2008 | Hazlehurst | |
| 2009/0182654 A1 | 7/2009 | Mullen et al. | |
| 2009/0240622 A1* | 9/2009 | Zandonadi | 705/40 |
| 2009/0271211 A1 | 10/2009 | Hammad | |
| 2010/0306091 A1 | 12/2010 | Homer et al. | |
| 2011/0029620 A1 | 2/2011 | Bonforte | |
| 2011/0166911 A1 | 7/2011 | Newman et al. | |
| 2011/0202459 A1* | 8/2011 | Shah et al. | 705/44 |
| 2011/0295731 A1* | 12/2011 | Waldron et al. | 705/35 |
| 2012/0221420 A1* | 8/2012 | Ross | 705/16 |

OTHER PUBLICATIONS

Office Action dated Apr. 2, 2012, Amendment dated Jul. 2, 2012 and Final Office Action dated Oct. 23, 2012 in U.S. Appl. No. 12/771,870, filed Apr. 30, 2010, (28 pages).
Office Action dated Aug. 1, 2012, Interview Summary dated Nov. 5, 2012 and Amendment dated Nov. 21, 2012 in U.S. Appl. No. 12/845,523, filed Jul. 28, 2010, (29 pages).

* cited by examiner

*Primary Examiner* — William Rankins
(74) *Attorney, Agent, or Firm* — Vista IP Law Group LLP

(57) ABSTRACT

Systems, method and articles of manufacture for identifying an account of an account holder, user or payor to be utilized for an electronic bill payment to a payee. An online bill payment system or separate program receives account data of the payor from payor accounts at financial institution that will process the electronic bill payment and from another financial institution at which the payor has an account. Data of accounts hosted by the other financial institution is received from a financial management system. Data such as account balances and transactions is analyzed to determine estimated balances of the accounts on a payment data and to generate account rankings or scores. Account selection is based at least in part upon the scores, and the selected account is presented to the payor and may then be used for the electronic bill payment, or the payor may select a different account.

38 Claims, 19 Drawing Sheets

910

912a   912b   912c

| Pre-Determined Dates | Account | Estimated Balance on Pre-Determined Date |
|---|---|---|
| Day1 | Account 1 | Estimated Balance 1-1 |
| Day1 | Account 2 | Estimated Balance 2-1 |
| Day1 | Account 3 | Estimated Balance 3-1 |
| Day1 | Account 4 | Estimated Balance 4-1 |
| Day2 | Account 1 | Estimated Balance 1-2 |
| Day2 | Account 2 | Estimated Balance 2-2 |
| Day2 | Account 3 | Estimated Balance 3-2 |
| Day2 | Account 4 | Estimated Balance 4-2 |
| Day3 | Account 1 | Estimated Balance 1-3 |
| Day3 | Account 2 | Estimated Balance 2-3 |
| Day3 | Account 3 | Estimated Balance 3-3 |
| Day3 | Account 4 | Estimated Balance 4-3 |
| Day4 | Account 1 | Estimated Balance 1-4 |
| Day4 | Account 2 | Estimated Balance 2-4 |
| Day4 | Account 3 | Estimated Balance 3-4 |
| Day4 | Account 4 | Estimated Balance 4-4 |
| Day5 | Account 1 | Estimated Balance 1-5 |
| Day5 | Account 2 | Estimated Balance 2-5 |
| Day5 | Account 3 | Estimated Balance 3-5 |
| Day5 | Account 4 | Estimated Balance 4-5 |
| Day6 | Account 1 | Estimated Balance 1-6 |
| Day6 | Account 2 | Estimated Balance 2-6 |
| Day6 | Account 3 | Estimated Balance 3-6 |
| Day6 | Account 4 | Estimated Balance 4-6 |
| Day7 | Account 1 | Estimated Balance 1-7 |
| Day7 | Account 2 | Estimated Balance 2-7 |
| Day7 | Account 3 | Estimated Balance 3-7 |
| Day7 | Account 4 | Estimated Balance 4-7 |

FIG. 9B

INTELLIGENT ACCOUNT SELECTION FOR ELECTRONIC BILL PAYMENT

BACKGROUND

Online bill pay systems allow a user to pay bills received from various payees through a website portal of a financial institution. These online bill payment systems (sometimes called online bill payment applications or online bill payment solutions) are offered by financial institutions such as banks, credit unions, credit card issuers, etc. The online bill pay systems allow a user to view, review, and/or make payments and pay bills to various payees from the user's financial account at the respective financial institutions.

Before bills can be paid electronically, a user sets up bill pay for a particular payee using the on-line bill payment system. The user sets up bill pay by selecting payees from a list of available payees provided by the online bill payment system or by entering payee information. The user may set up one payee or multiple payees to pay various bills or loans such as credit card bills, cell phone bills, phone bills, gas and electric bills, cable or satellite television, automobile loans, a mortgage or home equity loan, etc.

After the payees are set up, the user navigates to the online bill payment website or page using a web browser on a web enabled device, such as a personal computer, smartphone or tablet computing device connected to the Internet and manually enters payment instructions for each payee that the user desires to make a payment. These instructions indicate the account to be utilized as the source of funds, the payee, the payment amount and the payment date. The payment may be for a full outstanding balance, the minimum required payment, or another amount specified by the user. In this way, once the user sets up the payment instructions or preferences for a payee, the bill payment system can be utilized by the user to specify payments according to user input or make payments to the payee without any further action by the user.

While providing many conveniences to the user, currently available online bill payment systems have some limitations too. For example, it is not uncommon for a user to have multiple accounts such as checking, savings, money market and credit card accounts at the financial institution whose online bill pay system is utilized. Further, the user may have one or multiple other accounts at one, two, three and other numbers of financial institutions. Consequently, there may be various deposits to, withdraws or payments from, and transfers between various accounts of various financial institutions.

Given these account activities and complexities, one challenge users of online bill payment systems face is ensuring that the account to be utilized to electronically pay a bill has sufficient funds on the payment date, and that accounts for other scheduled payments have sufficient funds for their payments. For this purpose, the user may log into the account, view the current balance and any scheduled bill payments, look to see when other bills may be paid or when the user may receive a deposit from an employer, and make a best guess whether the account has or will have sufficient funds or whether a fund transfer is required. This can be inconvenient and quite complicated, particularly when the user has multiple accounts at the financial institution hosting the bill payment system and various accounts and other financial institutions, particularly when the user may not know all of the account details or transactions that may affect the end goal of having sufficient funds in an account for the bill payment. These uncertainties and complications are made even more complex when the user has multiple accounts, other accounts at other financial institutions, or a joint account with a spouse or other joint owner since the joint owner may have deposits, payments or transfers of which the other owner is not aware.

Given these issues, the user may consider the following factors or questions when reviewing user and/or spouse accounts and account activities when considering electronic bill payments: Do we have sufficient money in the funding account to pay a bill? How many payments have already been scheduled for the month against this funding account? When will I receive my next paycheck? Is the payment large? Should I split the payment across multiple accounts? Should I transfer money between accounts? Should I use my credit card? Which of my various credit cards should I utilize? What are the available credits on my credit cards and what are the APRs for the credit cards I could use?

Consequently, it can be difficult to navigate and know various account information of a user's various accounts to determine whether sufficient funds are available for an electronic bill payment. While electronic bill payments are intended to simplify a user's finances and make bill payments more convenient to users, it is often the case that the user has to consider various factors and data of various accounts that may be utilized by various account holders, and try to assess whether a particular account is suitable or has sufficient funds for electronic bill payment on a particular date.

SUMMARY

The present invention is directed to computer-implemented methods and systems and online bill pay applications or programs for analyzing account balances, transactions and account attributes to select or identify one or more accounts for a user, account holder or payor that are suitable for the electronic bill payment to a payee.

One embodiment is directed to a computer-implemented method for selecting an account to be utilized for an electronic bill payment to a payee and comprises receiving data of a plurality of accounts of a payor at a computer of a first financial institution computer that is utilized by the payor. At least one account is hosted by the first financial institution, and at least one other account is hosted by a different, second financial institution. The method further comprises determining or assigning respective scores to the plurality of accounts and selecting one or more accounts based at least in part upon a comparison of the respective scores. The selected account is presented to the payor who may confirm that the selected account is to be utilized for the electronic bill payment, or the payor may disregard the account that was selected and select another account.

A further embodiment is directed to a computer-implemented method for selecting an account to be utilized for an electronic bill payment to a payee and comprises receiving, at a computer of a first financial institution, data of a first account of the payor hosted by the first financial institution, data of a second account of the payor hosted by a different, second financial institution, and electronic bill payment data entered or selected by the payor and comprising at least a payment date. The method further comprises the first financial institution computer selecting at least one the first and second accounts as a source of funds for the electronic bill payment to the payee based at least in part upon respective account data of the first and second accounts and the electronic bill payment data.

In yet another embodiment, a computer-implemented method for selecting an account to be utilized for an electronic bill payment to a payee involves a financial institution computer comprising or accesses a cashflow engine and a ranking engine. The method comprises receiving, at a cashflow engine of the a first financial institution computer, data of one or more accounts of the payor hosted by the first financial institution, and data of one or more accounts of the payor hosted by a different, second financial institution. The cashflow engine determines respective estimated balances of the respective accounts on a payment date entered or selected by the payor. The ranking engine generates a ranking or respective scores for the respective accounts based at least in part upon the respective estimated balances on the estimated date, and respective attributes of the first and second accounts. The ranking or scores are compared by the ranking engine, and one or more accounts of the first and second financial institutions is selected based on having the higher ranking or score or a ranking or score that is greater than a pre-determined ranking or score. The at least one selected account is presented to the payor as an option for the electronic bill payment to the payee.

Another embodiment is directed to a computer-implemented method for selecting an account to be utilized for an electronic bill payment to a payee and comprises receiving data of a plurality of accounts of a payor at a computer of a financial institution computer that is utilized by the payor. The plurality of accounts is hosted by a single financial institution. The method comprises determining or assigning respective scores to the plurality of accounts and selecting one or more accounts based at least in part upon a comparison of the respective scores. The selected account is presented to the payor who may confirm that the selected account is to be utilized for the electronic bill payment, or the payor may disregard the account selected according to embodiments and manually select another account. The financial institution computer may comprise a cashflow engine and a scoring or ranking engine for determining which account(s) should be selected.

Further embodiments are directed to systems for selecting an account to be utilized for an electronic bill payment and that are operable, programmed or configured to implement method embodiments.

System embodiments may comprise or involve a financial institution computer comprising or accessing a cashflow engine and a ranking or score engine. The financial institution computer may further comprise or access a financial management system such as FINANCEWORKS, QUICKEN, QUICKEN On-Line, and MINT. The financial management system is operable to access or receive respective account data of various payor accounts hosted one or multiple financial institutions. The available or candidate accounts are then analyzed, e.g., based on their current or projected balances, transaction histories (e.g., payroll and other deposits and fund outflows such as credit card, home, auto, etc. payments), and attributes of the account, e.g., whether the account is a checking, savings or credit card account and other account attributes. System embodiments may, for example, comprise a financial institution computer operable, programmed or configured to implement method embodiments, a financial institution computer and a financial management system, a financial institution computer accessed by an account holder to execute an electronic bill payment and another computer of another financial institution at which the payor has accounts, multiple financial institution computers, and multiple financial institution computers and a FMS.

Other embodiments are directed to computer program products or articles of manufacture or computer program products comprising a non-transitory, computer readable storage medium having instructions which, when executed by a computer, cause the one or more processors or engines executing on a computer to execute a process for selecting an account to be utilized for an electronic bill payment. Embodiments may be a separate program that executes with or is executed by a bill pay system, or be embodied in or a part or module of a bill pay system.

In a single or multiple embodiments, the first financial computer hosts one or multiple accounts of the payor, who logs into an account or website hosted by the first financial institution and enters electronic bill payment data (e.g., payee, amount and payment date). The bill pay system comprising an account selection system receives the bill payment data and data for the various payor accounts hosted by the first financial institution, e.g., using an interface to access a core banking service, which retrieves account data at various branches of the first financial institution. According to certain embodiments, the account selection system also receives data of other accounts hosted by other financial institutions, e.g., using an interface to access data collected by a financial management system utilized by the payor. The financial management system may be hosted by or accessible to the payor while accessing the first financial institution computer or accounts, or hosted by another computer that is accessed by the first financial institution computer. One of the accounts is selected by the first financial institution as a funding source for the electronic bill payment by analyzing balance and/or transaction history data of the accounts and ranking or scoring the various accounts using a cashflow engine and ranking engine. The account that is selected may be an account hosted by the first financial institution or another account and is displayed to the payor who may then proceed with scheduling an electronic bill payment with the selected account or the payor may choose a different account.

For example, in a single or multiple embodiments, the cash flow engine receives data of multiple accounts of a particular financial institution, or in other embodiments, the cash flow engine receives first account data including a current balance and a transaction history of the first account and second account data including a current balance and a transaction history of the second account. The cashflow engine determines respective estimated balances of the first and second accounts on pre-determined dates (such as multiple dates, e.g., for a week, month or year, or the payment date entered by the payor or as received from a ranking engine) based at least in part upon respective current balances and respective transaction histories. The ranking engine then takes that data, generates or transforms it into rankings or scores of the accounts based at least in part upon balance and transaction history data, and the estimated balance on the payment date or on a date a certain number of days before and/or after the payment date, e.g., if the payor has flexibility when the payment is made and the payment date is not a deadline so that the payment can be made when the payor may have a higher balance and lower risk of a negative balance and penalties compared to the date selected by the payor. The ranking engine selects one or more accounts based at least in part upon the ranking or scores.

In a single or multiple embodiments, the ranking engine may generate a ranking or score based at least in part upon score components or values associated with account attributes in combination with the cashflow engine data or determinations. Examples of account attributes that may be assigned a score component or value that contributes to a final, total or weighed score include a type of account, terms or restrictions of the particular type of account, and prior use of the account for electronic bill payment for the same payee. For example, a checking account may be ranked or scored more favorably than savings, which is ranked or scored more favorably than a credit card. As another example, if payment from a credit card is considered, credit card terms such as the interest rate and available credit may be factors contributing to a score for that account. As s further example, if an account was used before for electronic bill pay to the payee, this prior use may result in a higher ranking, score or score weight compared to account that are being used for the first time or less frequently.

Further, in embodiments in which the payor proceeds with initially selecting an account for electronic bill payment, embodiments may be utilize to analyze the account selected by the payor, and if another account is ranked or scored higher than the account selected by the payor, or if there is another suitable account that can be utilized, the payor can be notified, e.g., by a window before the electronic payment is requested or processed, advising the payor that the payor may want to consider using a different account, e.g., to avoid or minimize the impact of cashflow issues, an estimated balance of the account for when the electronic bill payment was to be processed, or financial institution fees for the account having a low balance. Thus, embodiments may involve the payor entering bill payment data such as a payee, amount and payment date, and then embodiments selecting an account for the payor, or the payor may select an account, and embodiments may be used to verify that the selected account is acceptable, or if there are other account options that can be selected, or that another account is preferred or may also be utilized based on an account ranking or score.

BRIEF DESCRIPTION OF THE DRAWINGS

The foregoing and other aspects of embodiments are described in further detail with reference to the accompanying drawings, in which common elements are identified by the same reference number, wherein:

FIG. 9B illustrates a table including estimated account balances on multiple pre-determined payment dates generated by the cashflow engine;

DETAILED DESCRIPTION OF ILLUSTRATED EMBODIMENTS

Embodiments of the present invention are directed to computerized methods, systems and computer program products, articles of manufacture or applications for automated and intelligent selection of one or more accounts that are presented to an account holder or payor as options of sources of funds to be utilized for electronic bill payment system. With embodiments, the payor enters bill payment data such as the payee, amount and payment date to schedule the payment. Bill payment systems according to embodiments analyze data of accounts the payor has at one or multiple financial institutions and selects one or more accounts as options for the electronic bill payment. The account(s) selected by the bill payment system are presented to the payor who may accept that account or select another account for the electronic bill payment. With embodiments, an electronic bill can be paid from one account selected by the bill payment system or from multiple accounts, e.g., equal amounts paid from multiple accounts identified by a bill payment system or from an account selected in order to provide the payor with maximum interest earnings. Further aspects of embodiments are described with reference to FIGS. 1-18.

Figure 1:
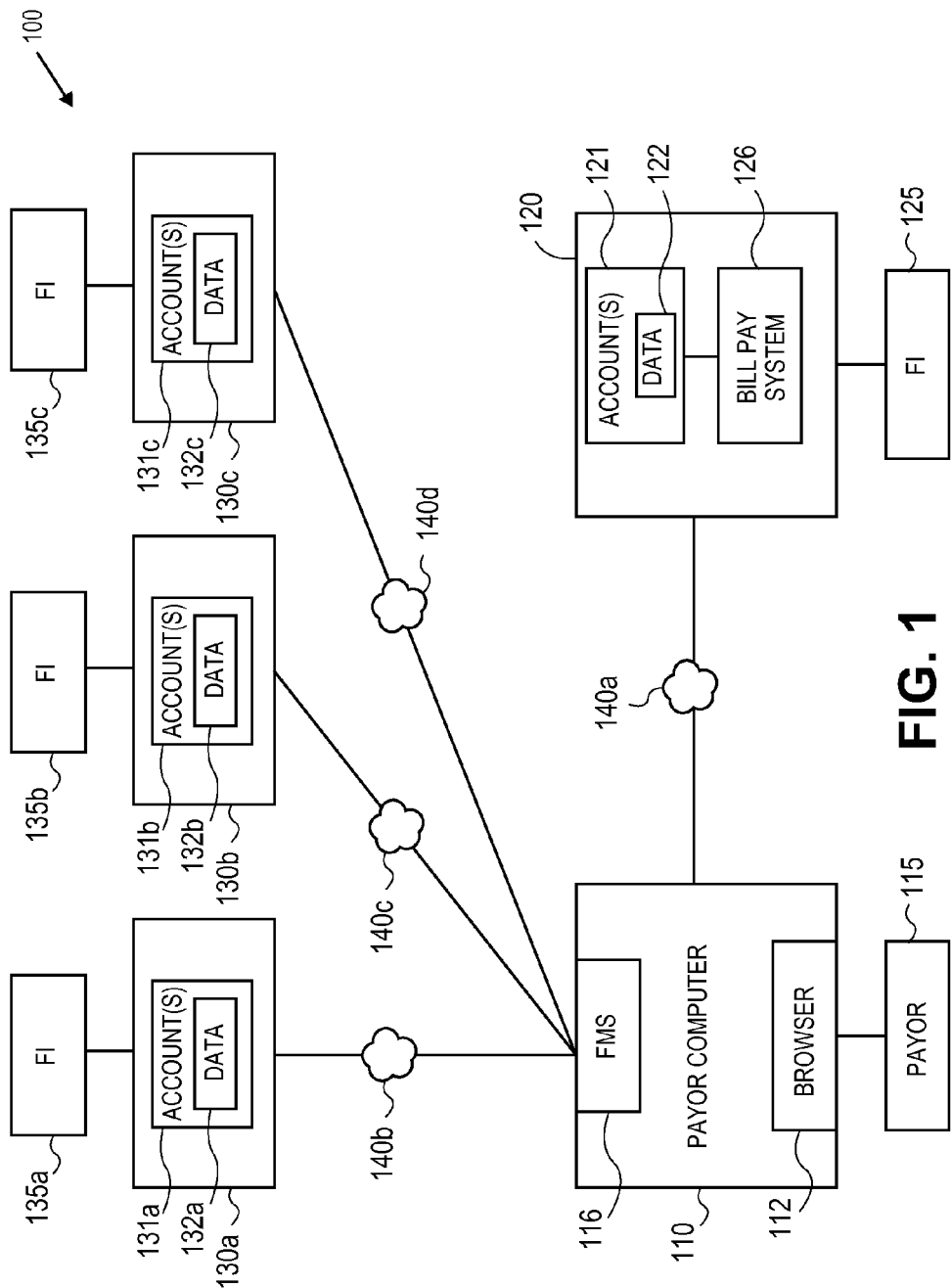
FIG. 1 is a block diagram of a system constructed according to one embodiment in which a bill pay system according to embodiments receives data of an account hosted by a first financial institution through which a bill pay request is submitted and data of another account hosted by a different, second financial institution account data from a financial management system hosted by a payor computer.

Referring to FIG. 1, one embodiment of a system 100 for intelligent and automated section of one or more accounts to be utilized for an electronic bill payment comprises or involves a computer 110 of a user, account holder or payor 115 (generally, payor 115), a computer 120 of a financial institution (FI) 125 that hosts one or more accounts 121 with associated account data 122. Account data 122 is defined to include balance, transactions, payments and account attributes. For ease of explanation, reference is made generally to account data 122. The system 100 further comprises or involves a bill payment system, application or program 126 (generally, bill payment system 126) configured, operable or programmed according to embodiments for making electronic payments to a payee (not illustrated in FIG. 1), and one or more computers 130a-c (generally, computer 130) of respective other FIs 135a-c (generally, FI 135) with which the payor 115 has one or more other accounts 131a-c (generally, account 131). While FIG. 1 illustrates a system 100 involving multiple FIs 125, 135, embodiments may involve multiple payor accounts 121 at a single FI 125. For ease of explanation, and to show how embodiments can be expanded to analysis of accounts 121 of multiple FIs, reference is made to a FI 125 that hosts one or more accounts 121 and a bill pay system 126, and other FIs 135 that host other accounts 131.

The payor computer 110 may be, for example, a desktop computer, laptop or other portable computer, a tablet computing device, smartphone or other computing or mobile communication device capable of communicating with FI computers 120, 130 via respective networks 140a-d (generally, network 140). For ease of explanation, reference is made generally to a payor computer 110. The payor 115 may access a FI computer 120, 130 through a network 140 using a browser 112 that executes on the payor computer 110.

Examples of networks 140 shown in FIG. 1 and other networks discussed herein that may be utilized for communications between system 100 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 140 generally, but various networks, combinations of networks and communication systems, methods and protocols may be utilized in embodiments.

With continuing reference to FIG. 1 the payor 115 also utilizes or accesses a financial management system (FMS) 116. The FMS 116 executes on the payor computer 110 (as shown in FIG. 1) or is hosted by a FI computer 120 or 130 and accessed by the payor through a network 140. The FMS 116 is in communication with respective computers 130a-c of other FIs 135a-c through respective networks 140b-d and accesses, receives or collects data 132 (defined to include balances, transactions and account attributes, generally account data 132) of accounts 131a-c of the payor 115 hosted by the various other FIs 135a-c (generally, FI 135 or other FI 135). More particularly, the FMS 116 is configured to receive account data 132a-c of respective payor accounts 131a-c hosted by at FIs 135a-c that may, for example, be checking, savings or credit card accounts with associated balances, and transactions (deposits, withdraws, payments, etc.).

While FIG. 1 shows the FMS 116 collecting or receiving account data 132 from FI computers 130, the FMS 116 may also be hosted by and/or collect data from FI computer 120. Further, the payor 115 may have one or multiple accounts 121, 131 at each of the FIs 125, 135. For ease of explanation, reference is made to a FMS 116 that collects account data 132 from FI computers 130 other than the FI computer 120 that has been accessed by the payor 115 to request or schedule an electronic bill payment, but embodiments are not so limited.

The FMS 116 aggregates and presents account data 132 within a composite view or a view that presents data 132 of multiple accounts 131 to the payor 115. The term "financial management system" or FMS 116 is defined to include, any computing system implemented, on-line or web-based, system, package, program, module, or application that gathers, receives or retrieves account data 132, analyzes and categorizes at least part of the account data 132 into various reports or displays that are provided to the payor 115 (e.g. a single screen display including data 132 of multiple accounts 131), and provides the payor 115 with the capability to conduct, and/or monitor transactions of accounts 131.

Types of financial management systems 116 include, but are not limited to any of the following: an on-line, or web-based, or computing system implemented receipt collection financial management system, package, program, module, or application (generally, "system"), personal financial management system, personal accounting system, personal asset management system, personal/home business inventory system, business accounting system, business financial management system, business inventory system, business asset management system, healthcare expense tracking system, and data management system as discussed herein, and/or as known in the art at the time of filing, and/or as developed after the time of filing.

Specific examples of financial management systems 116 currently available or described in applications incorporated herein by reference and that may be utilized to implement embodiments include, but are not limited to: QUICKEN, QUICKEN On-Line, QUICKBOOKS, QUICKBOOKS On-Line, FINANCEWORKS and MINT all of which are available from Intuit Inc. of Mountain View, Calif.; MICROSOFT Money, available from Microsoft, Inc. of Redmond, Wash.; and various other financial management systems 116. Further details regarding these examples are provided in ofm.financeworks.com, www.mint.com, www.quicken.com, the contents of which are incorporated herein by reference.

Figure 2:
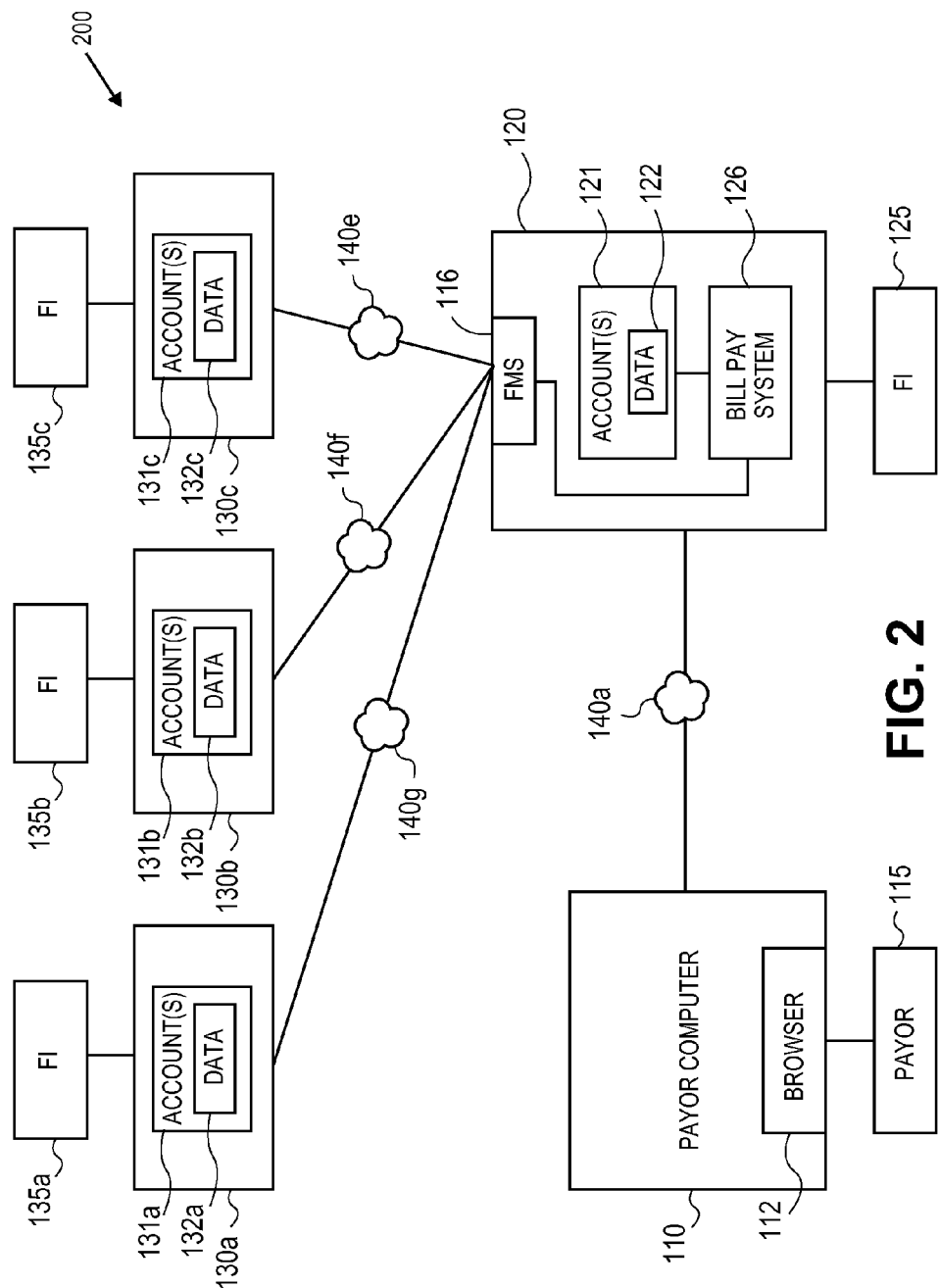
FIG. 2 is a block diagram of a system constructed according to another embodiment in which a bill pay system according to embodiments receives data of an account hosted by a first financial institution through which a bill pay request is submitted and data of another account hosted by a different, second financial institution account data from a financial management system hosted by the first financial institution computer.

As shown in FIG. 1, the FMS 116 may execute on the payor computer 110 and access, receive or collect and aggregate account data 132 from the various FI computers 130. According to another system 200 embodiment as shown in FIG. 2, the FMS 116 is hosted by a FI computer 120 that also hosts the bill payment system 126 so that when the payor 115 logs into an account 121 hosted by the FI 120, the payor 115 can launch the FMS 116 from within the account 121 or while accessing the FI computer 120, and utilize the FMS 116 to access accounts 121 hosted by that FI 120 as well as accounts 131 hosted by other FIs 130 through respective networks 140e-g (generally, network 140). One example of a FMS 116 that may be utilized for this purpose is FINANCEWORKS, available from Intuit Inc. For ease of explanation, reference is made to a FMS 116 generally, but it should be understood that the FMS 116 may be hosted or accessed by various system 100 components including the payor computer 110, FI computer 120, and other FI computers 130. Further, while FIGS. 1 and 2 show the FMS 116 and bill payment system 126 as separate components, it will be understood that the bill payment system 126 incorporating embodiments or that utilizes embodiments may be incorporated into the FMS 116 such that electronic bill payments can be made through a bill payment system 126 offered and hosted by the FI 125 or through the FMS 116 utilized by the payor 115.

Figure 3:
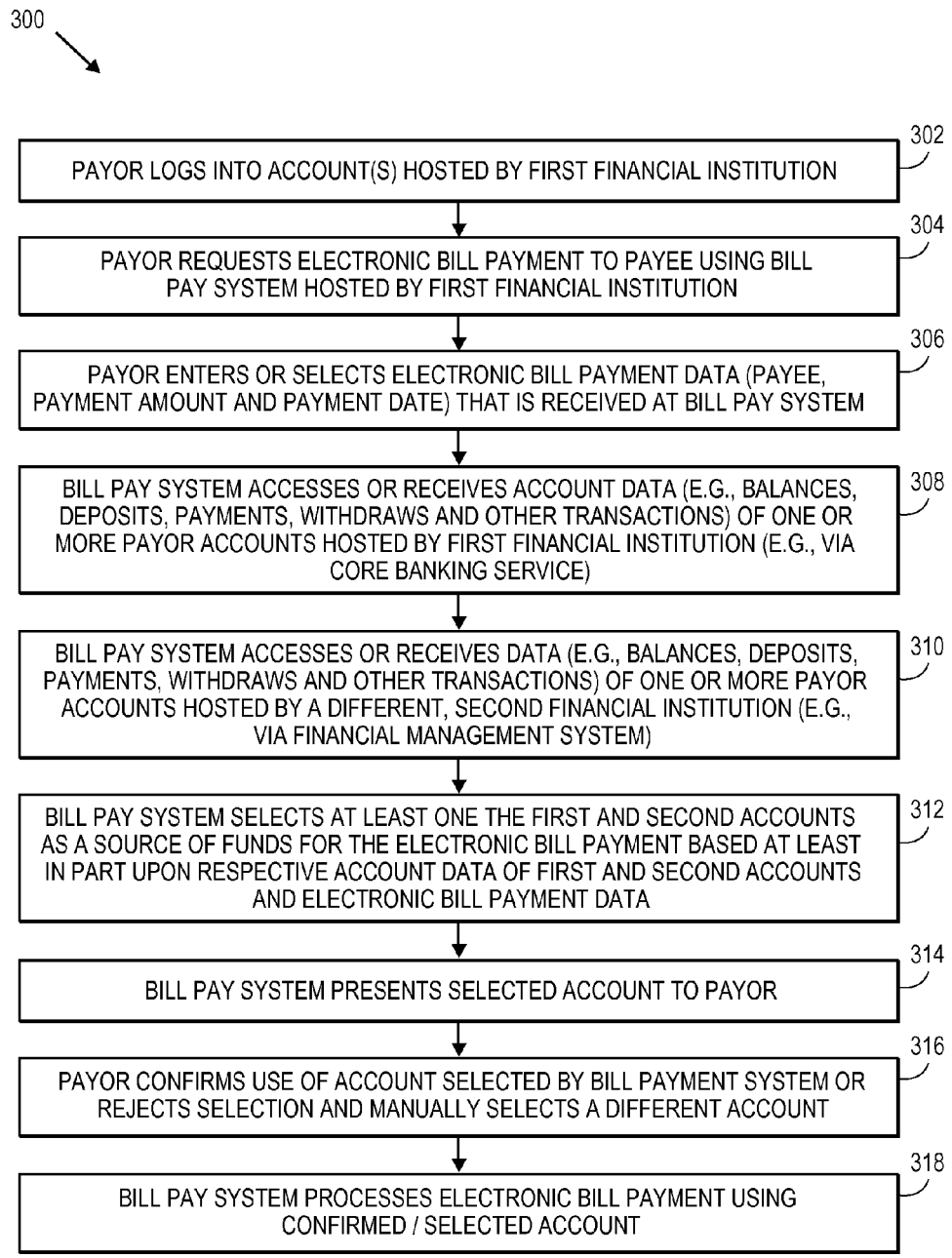
FIG. 3 is a flow diagram of one embodiment of a method for intelligent selection of an account as a candidate source of funds for an electronic bill payment.

Referring to FIG. 3, one embodiment of a method 300 for intelligent and automated selection of an account to be utilized for an electronic bill payment and that may be implemented using system 100, 200 components shown in FIGS. 1-2 comprises, at 302, the payor 115 logging into an account 121 hosted by the FI computer 120 that will be utilized to process the electronic bill payment using bill payment system 126 configured according to or utilizing embodiments. For this purpose, the payor 115 may execute the browser 112 to access the FI computer 120 and enter credentials such as the payor's username and password.

Figure 4:
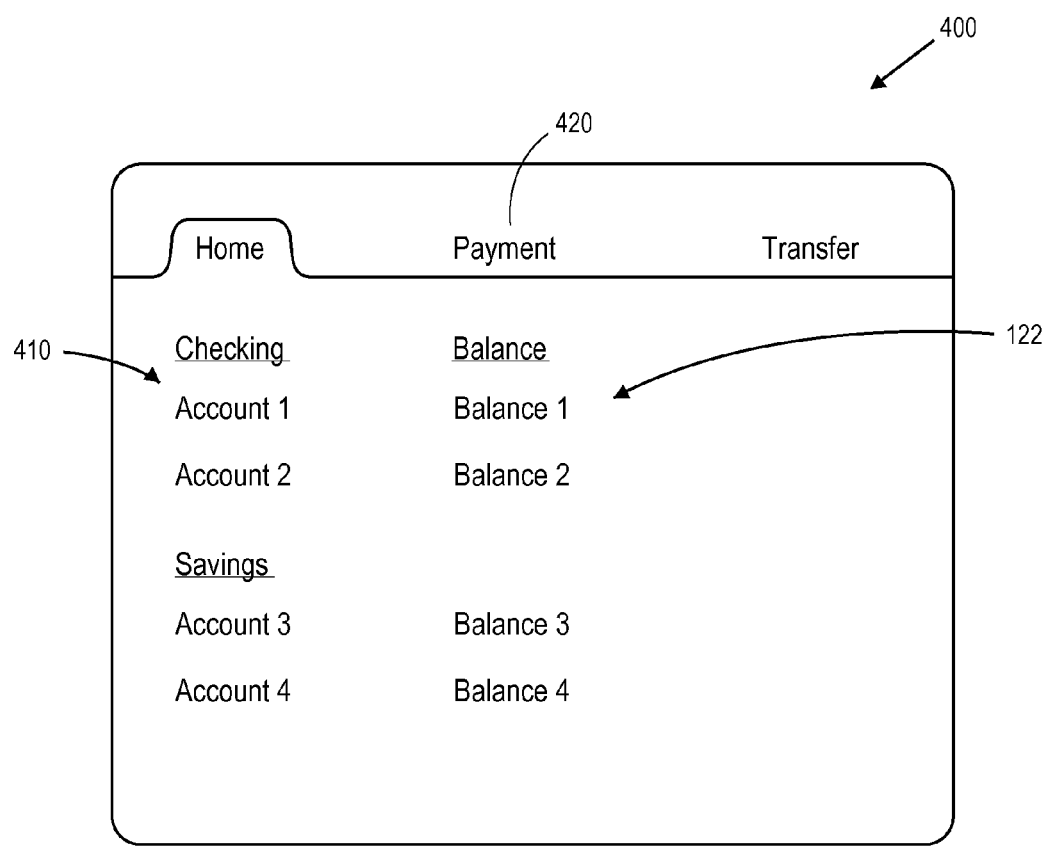
FIG. 4 illustrates an example of a page displayed to a payor and indicating account data and an option to make an electronic bill payment.

FIG. 4 illustrates an example of a page 400 that may be displayed to the payor 115 while accessing account 121 and includes a home or summary page 410 listing various accounts 121 such as checking and savings accounts, respective account data 122 such as account balances, and a payment tab or option 420 that can be selected by the payor 115 to be directed to a page for electronic bill payment.

Referring again to FIG. 3, at step 304, the payor 115 selects the "payment" tab 420 or other element to navigate to an appropriate page utilized to initiate a request to make an electronic bill payment to a payee using the bill pay system 126 hosted by the first FI 125. At step 306, the payor 115 enters or selects electronic bill payment data.

Figure 5:
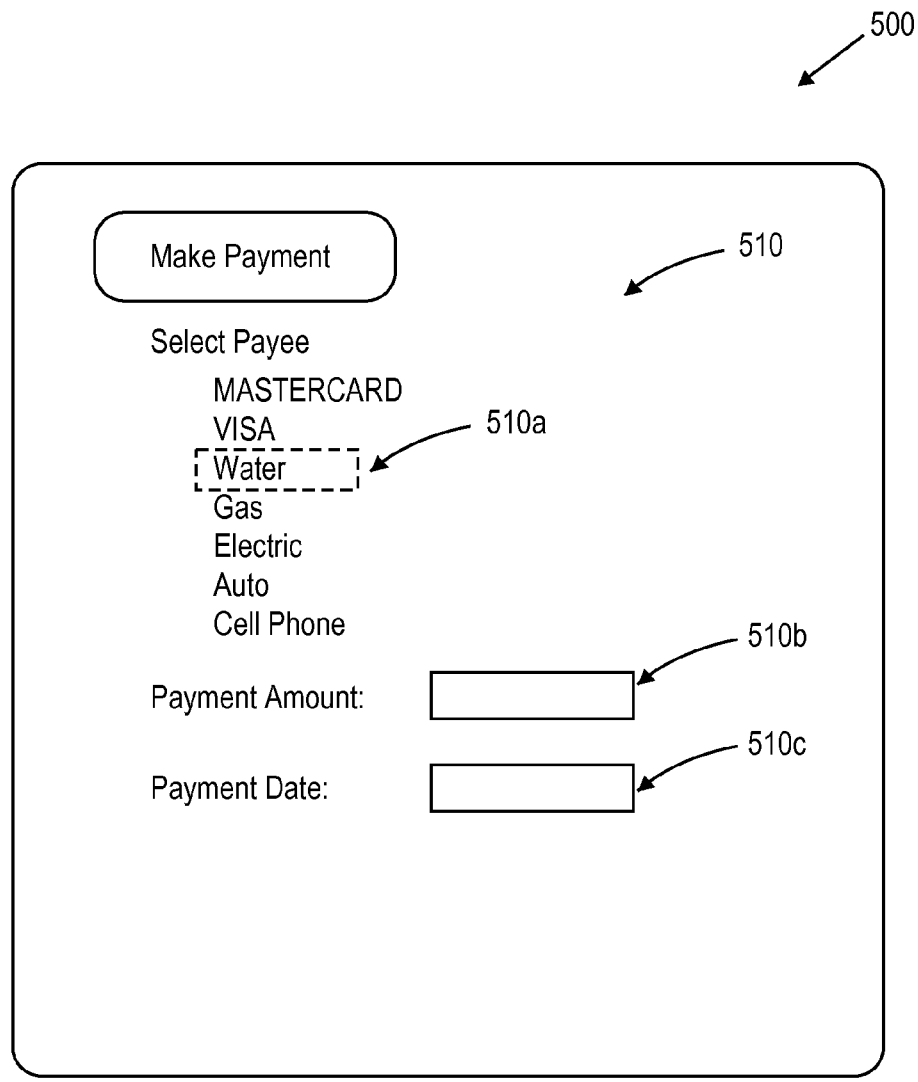
FIG. 5 illustrates an interface utilized by the payor to enter bill payment data including entry or selection of a payee, payment date and payment amount.

Referring to FIG. 5, according to one embodiment, the payor 115 navigates to a bill payment page 500 and enters or selects electronic bill payment data 510 including a name or identity of the payee 510a, which was previously set up by the payor 115 so that the payor 115 can select the payee name 510 from a menu, the payment amount 510b and the payment date 510c. Examples of payees 510a include an issuer or credit card company (such as MASTERCARD or VISA), a utility company (such as a water, electric or gas company), a cellular telephone or internet service, or a lender or institution from which the payor has a loan such as an automobile, mortgage, home equity loan, educational loan, etc. For ease of explanation, reference is made generally to a payee 510a. Thus, with certain embodiments, the payor 115 is not required to enter or select an account to be utilized for the electronic bill payment since embodiments analyze payor's accounts 121, 131 and select an account as a candidate funding source for the electronic bill payment, as described in further detail below.

Referring again to FIG. 3, in response to receiving the bill payment data 510 entered or selected by the payor 115, at step 308, the bill pay system 126 accesses one or more accounts 121 to determine or read account data 122, or receives account data 122 of one or more payor accounts 121 hosted by the first FI 125. The bill pay system 126 may access the account 121 that is hosted by that particular FI branch directly or by interfacing with a Centralized Online Realtime Exchange or "Core" service (hereafter, core service) so that account data 122 from all of the FI's 125 branches are received from a centralized datacenter. In this manner, the account data 122 reflects all transactions conducted at various locations or branches of the FI 125.

At step 310, the bill pay system 126 also accesses or receives account data 132 of one or more payor accounts 131 hosted by one or more other FIs 135 other than the first FI 125. For this purpose, the bill pay system 126 may access or receive account data 132 from these accounts 131 by interfacing with the FMS 116. While embodiments may involve one or multiple accounts 131 hosted by FIs 135 and one or multiple accounts 131 hosted by each other FIs, reference is made to an account 121 hosted by a first FI 125 (which hosts the bill pay system 126) and an account 131 hosted by another, different FI 135 and that is accessed through a FMS 116.

At step 312, the bill pay system 126 analyzes payor's accounts 121, 131 and selects at least one the first and second accounts 121, 131 as a candidate source of funds from which the electronic bill payment will be paid. The bill pay system 126 makes this selection based at least in part upon analysis of respective account data 122, 132 (e.g., one or more or all of balance, deposits, withdraws, payments) of first and second accounts 131, 132 and the electronic bill payment data 510 (payee, payment amount, payment date) entered or selected by the payor 115.

Figure 6:
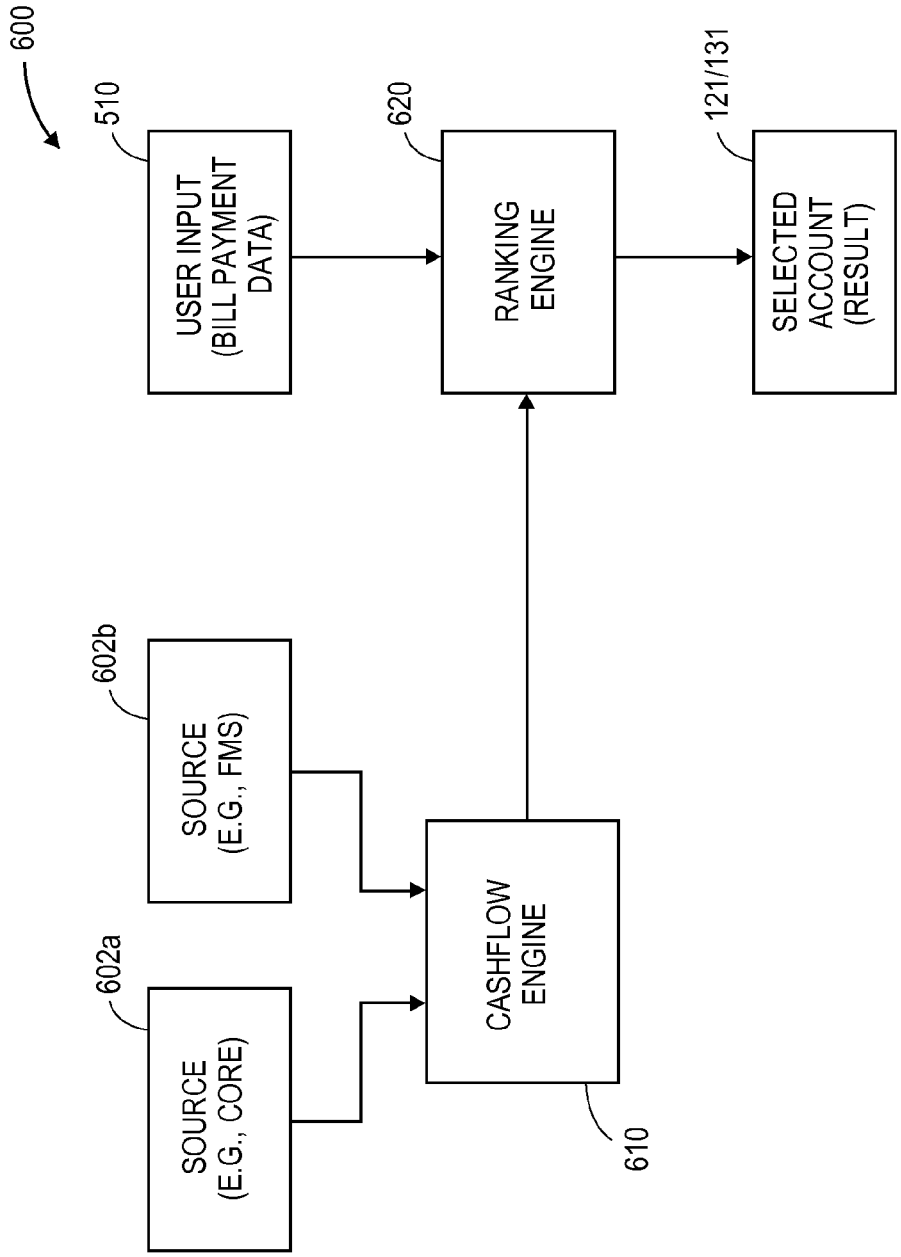
FIG. 6 is a block diagram of an intelligent account selection system that is a part of or utilized by a bill pay system for electronic bill payment from a payor account holder to a payee.

Referring to FIG. 6, according to embodiments, the bill pay system 126 embodies, utilizes or accesses an intelligent and automated account selection system 600 (generally, account selection system 600) to implement certain method 300 steps. According to one embodiment, the account selection system 600 includes or involves a first source 602a of data 122 of the account 121 hosted by the first FI 125, a second source 602b of data 132 of the account 131 hosted by another, different FI 135, a cashflow engine 610, and a ranking engine 620. It will be understood that one or more components of the account selection system 600 shown in FIG. 6 may be part of the bill pay system 126 or a standalone system or program that operates with a bill pay system 126. For ease of explanation, reference is made generally to a bill pay system 126 and components of the account selection system 600 as shown in FIG. 6.

With continuing reference to FIG. 6, the cashflow engine 610 is configured, operable or programmed to determine estimated balances of accounts 121, 131 of the payor that are candidates to serve as funding sources for the electronic bill payment in the specified payment amount on the specified payment date. For this purpose, the cashflow engine 610 is in communication with multiple sources 602a,b of account data 122, 132, e.g., through respective interfaces such as respective Application Program Interfaces (APIs).

According to one embodiment, one source 602a of account data 122 is data of one more accounts hosted by the FI 125 utilized for the electronic bill payment and may be a core service as described above. The cashflow engine 610 also receives account data 132 from another source 602b which, in the illustrated embodiment, is a FMS 116 utilized by the payor 115. As discussed above, the FMS 116 may execute on the payor computer 110 or on a FI computer 120, 130. The FMS 116 includes account data 132 including transaction data of various accounts 131 including checking, savings, credit card, etc. such as balance, deposit, withdraw, and payment data.

Figure 7:
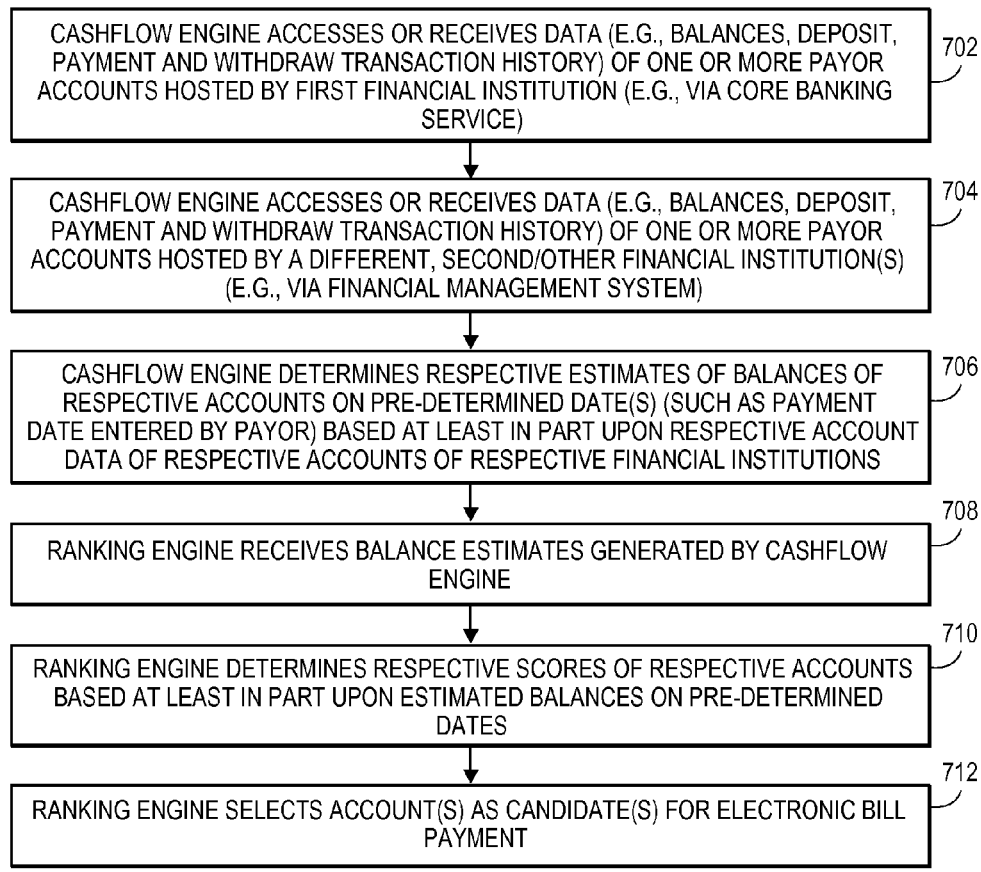
FIG. 7 is a flow diagram of one embodiment of a method for selecting an account as a candidate source of funds for an electronic bill payment using cash flow and ranking engines shown in FIG. 6.

Thus, referring to FIG. 7, at steps 702 and 704, the cashflow engine 610 receives account data 122, 132 from different sources, and according to one embodiment, one source 602a is the particular FI 125 or a core service thereof, and at least one other source 602b is a FMS 116 that accesses account data 132 of various or multiple FIs 135, which may or may not include the FI 125 utilized to execute the electronic bill payment.

Figure 8:
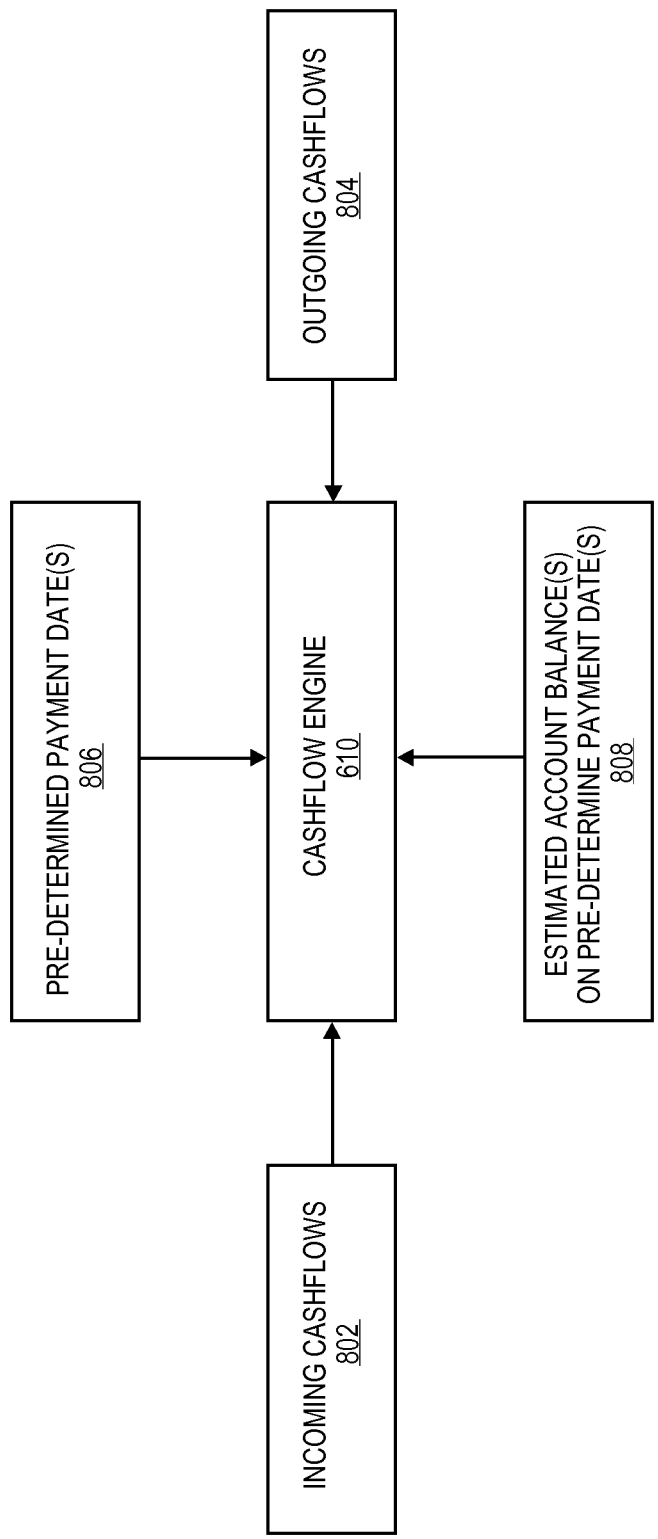
FIG. 8 illustrates data received and generated by a cash flow engine of an account selection system constructed according to embodiments.
Figure 9A:
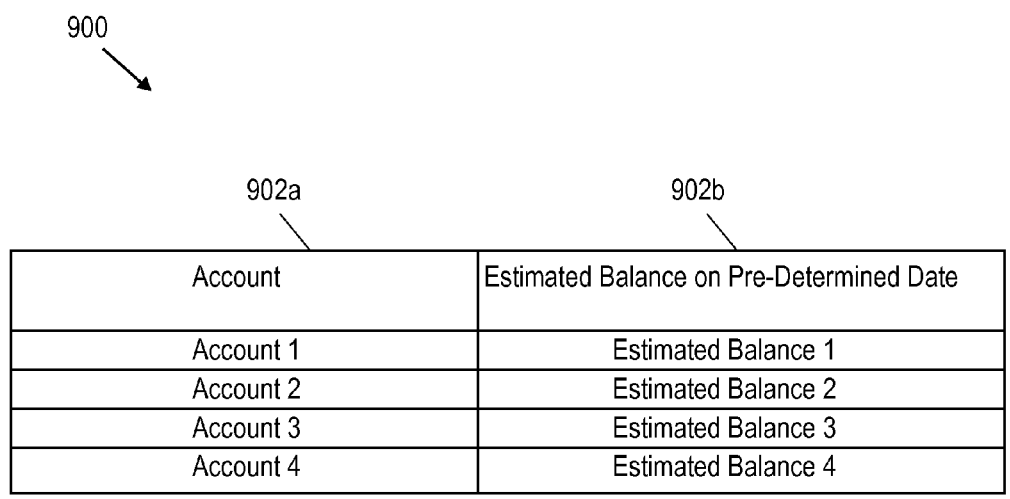
FIG. 9A illustrates a table including estimated account balances on a pre-determined payment date generated by the cashflow engine.

At step 706, and with further reference to FIGS. 8 and 9A-B, the cashflow engine 310 analyzes incoming cashflows 802 of account data 132 such as deposits (e.g., payroll deposits) and outgoing cashflows 804 of account data 132 such as check payments, electronic bill payments, cash/ATM withdraws, and other payments or transactions, and determines respective estimates 808 of balances of respective accounts 121, 131 on pre-determined date(s) 806.

According to one embodiment, the pre-determined date 806 is selected by the payor 115 and is the payment date 510c that was specified or selected by the payor 115. FIG. 9A illustrates a table 900 generated by the cashflow engine 610 that includes balance estimates 808 (column 902b) for the various accounts 121, 131 (column 902a) (four accounts are shown as an example) being analyzed on the pre-determined data of the payor's requested payment date 510c.

Thus, although FIG. 6 shows the payment date 510c as part of the bill payment data 510 that was entered or selected by the payor 115 and is an input to a ranking engine 620 (described in further detail below), the payment date 510c may also be an input to the cashflow engine 610 so that the cashflow engine 610 operates to generate estimates 808 of balances of accounts 121, 131 on that payment date 510c.

According to another embodiment, the pre-determined date 806 is another date selected by the payor 115. According to yet another embodiment, the pre-determined dates 806 are dates that electronic bill payments were made previously (e.g., monthly mortgage or utility payments), and then determines respective estimated balances 808 of accounts 121, 131 on one or more of those dates.

According to a further embodiment, the cashflow engine 610 determines account balance estimates 808 for some or all of the pre-determined dates 806 during a certain period of time such as some or all of the dates during the next week, next two weeks, next month, or another time. In the embodiment illustrated in FIG. 9B, a table 910 generated by the cashflow engine 610 includes columns 912a-c for estimates 808 of balances of accounts 121, 131 for one week to allow analysis of balances on the payment date 510c and days before and after the payment date 510c. In FIG. 9B, Estimated Balance 1-1 refers to an estimated balance of Account 1 on Day 1, and Estimated Balance 1-2 refers to an estimated balance of Account 1 on Day 2, and so on for other accounts and dates.

Figure 10:
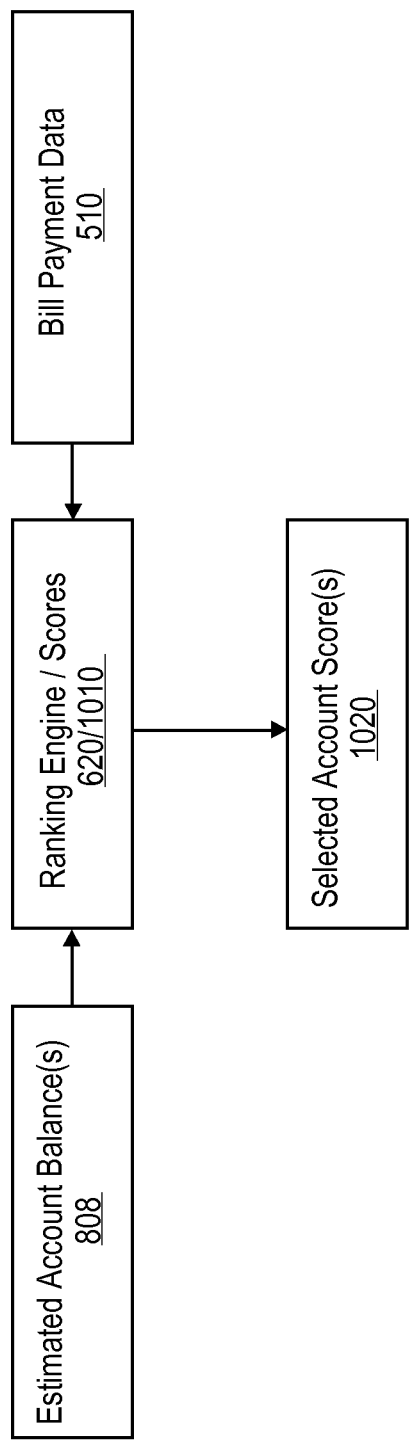
FIG. 10 illustrates data received and generated by a ranking engine of an account selection system constructed according to embodiments.
Figure 11:
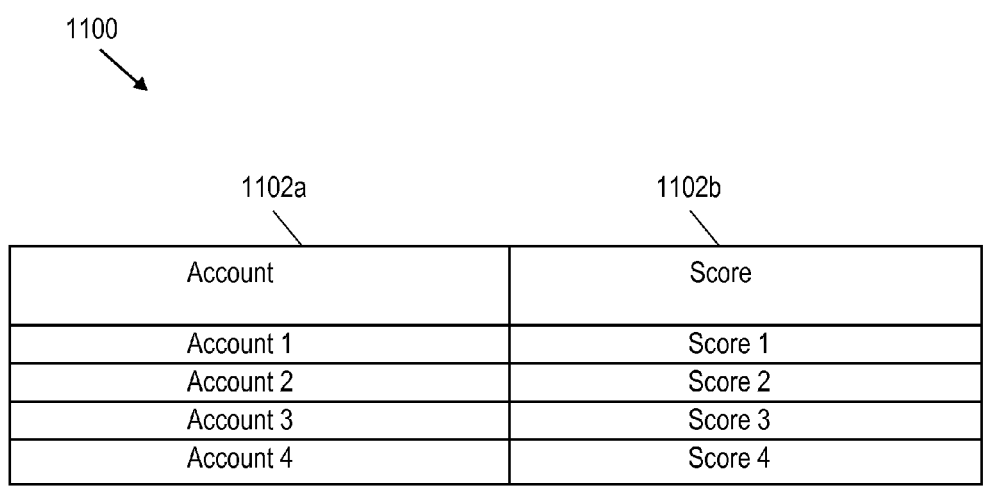
FIG. 11 illustrates a table identifying accounts and respective account scores generated by a ranking engine.

Referring again to FIGS. 6-7, and with further reference to FIGS. 10-11, in one example implementation in which the cashflow engine 610 generated estimated balance(s) 808 of four accounts 121, 131 for the pre-determined date(s) 806, at step 708, the estimated balance(s) 808 are provided to the ranking engine 620, which also receives bill payment data 510 (payee, payment amount and payment date). At step 710, the ranking engine 620 determines or generates respective scores 1010 (generally illustrated in FIG. 11) of the respective accounts 121, 131 for which estimates 808 were generated and that may be utilized for electronic bill payment.

The scores 1010 are based at least in part upon the balance estimate(s) 808 received from the cashflow engine 610. At step 712, the ranking engine 620 selects at least one account 121, 131 for the electronic bill payment based at least in part upon the generated scores 1010.

The scores 1010 may be based on the estimated account balance 808 such that accounts 121 and/or 131 are selected 1020 by the ranking engine 620 to indicate that the account 121 and/or 131 would have sufficient funds for payment amount 510b to be paid on the payment date 806 or other pre-determined date. According to another embodiment, the score indicates account balances such that the account 121, 131 with the highest balance is selected 1020 by the ranking engine 620 so as to reduce the risk of a negative balance following payment. Thus, as shown in FIG. 11, account 3 has the highest score 1010 and thus would be selected 1020 by the ranking engine 620.

Figure 12:
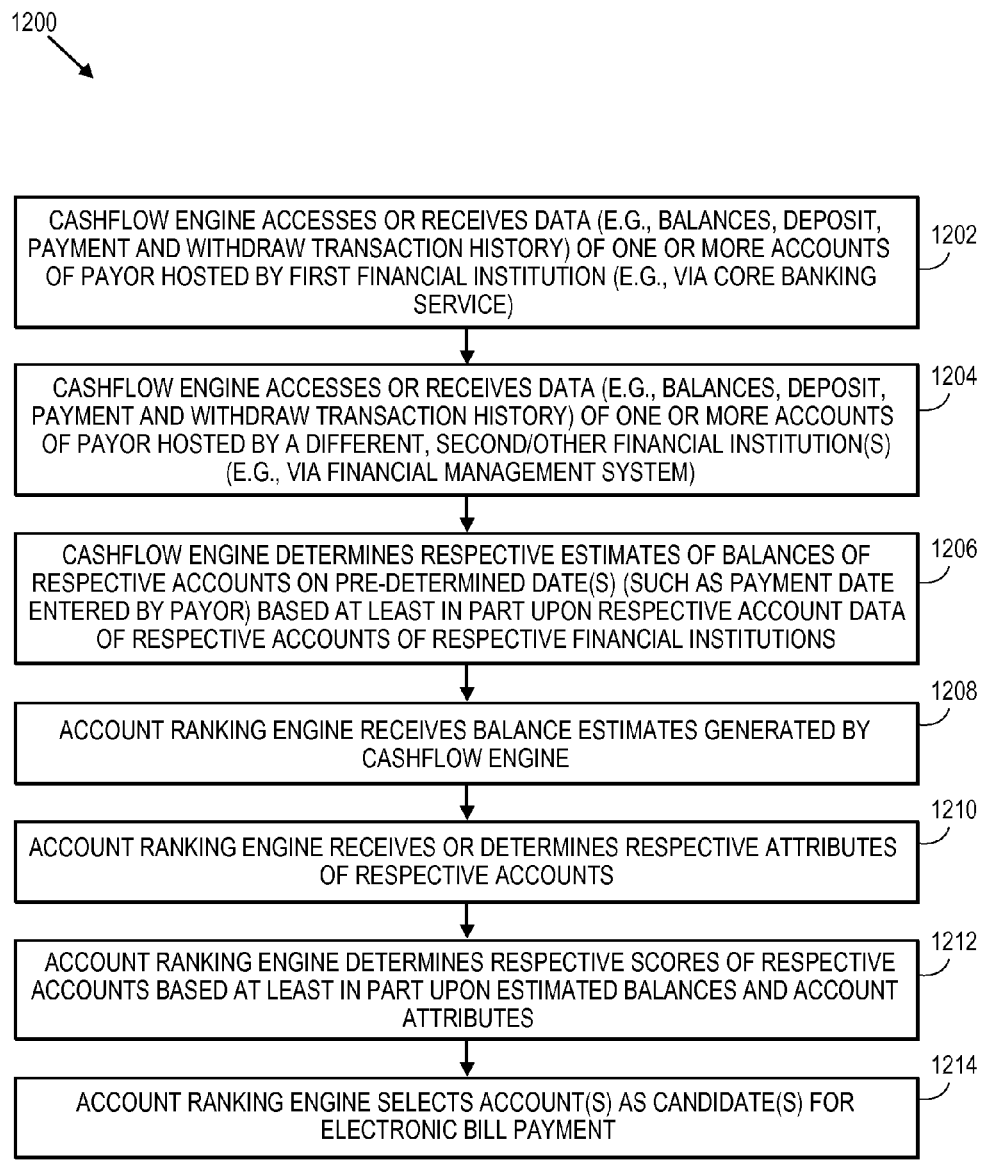
FIG. 12 is a flow diagram of one embodiment of a method for selecting an account as a candidate source of funds for an electronic bill payment using a cash flow engine and a ranking engine that generates scores based at least in part upon account attributes.
Figure 13:
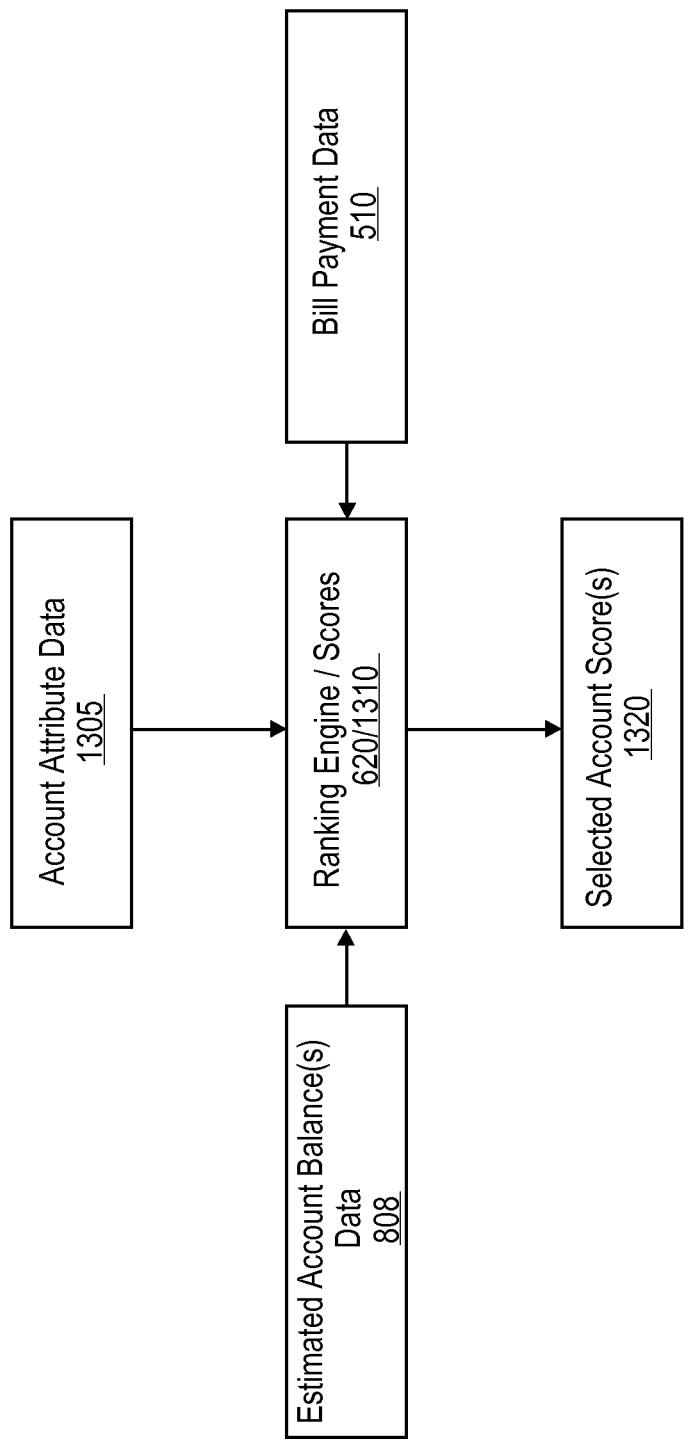
FIG. 13 illustrates data including account attribute data received by a ranking engine and data generated by the ranking engine according to embodiments.

In the embodiment illustrated in FIGS. 7-11, the ranking engine 620 considers the estimated balances 808 generated by the cashflow engine 610 and the pre-determined dates 806 to score or rank the respective accounts 121, 131. Referring to FIGS. 12-13, according to another embodiment, the ranking engine 620 considers additional data or other account attributes 1305 (besides account balance estimates 808 on a pre-determined date 806) in order to determine account scores 1310 that are based at least in part upon the account attributes 1305 and to select which account(s) 121, 131 should be selected for the electronic bill payment. In the illustrated method 1200, steps 1202-1208 are the same as steps 702-708 described above with reference to FIG. 7 and thus are not repeated.

At step 1210, the ranking engine 620 receives an additional input in the form of respective attributes 1305 of respective accounts 121, 131. Examples of account attributes 1305 include but are not limited to: a current account balance, a projected account balance on the payment date after application of the electronic bill payment from the account, an projected account balance after the payment date after application of the electronic bill payment from the account, a type of account (e.g. checking, savings, money market, credit card), interest rate (earned on checking, savings and money market), income received given balance and interest rate, prior use of the account by the payee for electronic bill payment, existing bill payments already scheduled for payment from an account, whether an FI charges a fee if a balance of an account falls below a pre-determined minimum balance.

For example, values or score components (generally, value) associated with an account attribute 1305 of current account balance would be higher or more favorable for higher balances compared to accounts with lower balances or accounts having balances less than a pre-determined minimum balance. As another example, values associated with an account attribute 1305 of a projected account balance on the payment date after application of the electronic bill payment from the account would be higher or more favorable if the post-payment balance for a subject account is greater than a post-payment balance for another account, or if the post-payment balance is greater than a pre-determined minimum balance. As a further example, values associated with an account attribute 1305 of the type of account would be higher or more favorable if the type of account is a checking account compared to a savings or credit card account, or a checking or savings account compared to a credit card account. As yet another example, values associated with an account attribute 1305 of an interest rate or interest earned on an account by the payor would be higher or more favorable with higher interest rates or greater interest earnings, or an interest rate or interest earning that is greater than a pre-determined minimum interest rate or interest earning. For example, higher yield savings account may be associated with a higher value compared to a checking account that pays very little or no interest. Further if the balance of the higher yield savings account is low compared to a balance on a lower earning checking account, the value assigned to the checking account may be higher if the amount of interest earned on the checking account is greater than the amount of interest earned on the savings account if, for example, the payor historically maintains most funds in a checking account rather than the savings account.

As a further example, a value assigned to an account attribute 1305 of prior use of the account by the payee for electronic bill payment would be higher if the user utilized the account for electronic payment before or used the account a pre-determined minimum number of times for that purpose. Further, a value assigned to an account attribute 1305 of existing bill payments already scheduled for payment from an account may be higher or more favorable if there are no other bill payments scheduled, less than a pre-determined number of bill payments scheduled, of if the total amount of all scheduled bill payments is less than a pre-determined amount, or if the total amount of all scheduled bill payments would still result in a positive balance of the subject account.

As another example, a value assigned to an account attribute 1305 of whether a FI charges a fee if a balance of an account falls below a pre-determined minimum balance may be higher or more favorable if no such fee is charged compared to other accounts to which the low balance fee may apply, and higher or more favorable compared to another account if the fee for one account is less than the minimum balance fee for another account.

These account attributes 1305 are determined from the sources 602a, 602b such as a CBS and FMS as discussed above, from other account details or entered by the payor 115 as necessary. Account attributes 1305, if applicable, are assigned different point values or score components that, according to one embodiment, are summed together to determine a final score 1310. According to another embodiment, values or core components are assigned the same or different weights to determine a final, possibly weighted, score 1301 determined by the ranking engine 620. Thus, embodiments may involve one, two, three or other numbers of such account attributes 1305, which may be equally weighted or weighted according to significance to electronic bill payment, and each account 121, 131.

Further, according to embodiments, the values are generated or determined based upon the same set of account attributes 1305 for each account 121, 131. According to other embodiments, different accounts 121, 131 are analyzed relative to respective attributes 1305. Further, embodiments may involve a common set of account attributes 1305 that apply to all or some accounts, while other accounts have other attributes 1305 upon which their respective scores 1310 are based. For example, account attributes 1305 that are common to all accounts analyzed may be a type of account (e.g. checking, savings, money market, credit card) and whether the user made electronic bill payments from the account before. Other attributes 1305 that may be specific to the type of account include, for example, the rate of interest earned on the account (for checking, savings and money market) or an interest rate charged to the user (e.g., for a credit card account). Thus, it will be understood that various type, numbers and combinations of account attributes 1305 and associated values or score components may be utilized to analyze whether an account 121, 131 is suitable for a payment amount 510b on a payment date 510c or other pre-determined date.

Referring again to FIG. 12, at step 1212, the ranking engine 620 determines respective scores 1310 of respective accounts 121, 131 that may be candidates for the electronic bill payment based at least in part upon the respective account attributes 1305, and then at 1214, the ranking engine 620 selects an account 1310 as a candidate for the electronic bill payment.

Figure 14:
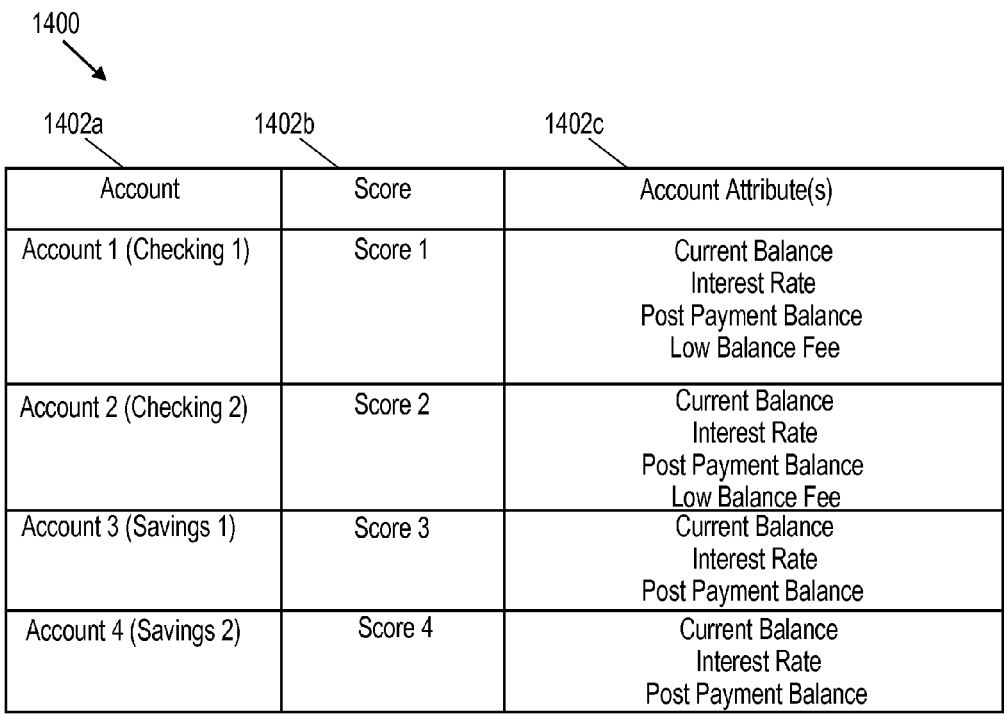
FIG. 14 illustrates a table including scores for respective accounts generated by the ranking engine for a payment date and that are based at least in part upon account attribute data.

As shown in FIG. 14, for purposes of illustrating the analysis and comparison performed by the ranking engine 620, the ranking engine 620 may generate a data structure 1400 such as a table (generally, table 1400) that includes a column 1402a identifying the account 121, 131 or account type, and a column 1402b for respective scores 1310 of the accounts 121, 131. The table 1400 may also include a column 1402c indicating which account attributes 1305 were considered when determining a score 1310 for the account 121, 131. For example, column 1402c indicates that scores for checking accounts were based on account attributes 1305 of a current checking balance, an interest rate, a post-payment balance, and a fee charged by a FI if a balance of a checking account falls below a pre-determined minimum balance, whereas account attributes 1305 for savings accounts are the same except for the low balance fee. Of course, it will be understood that embodiments may involve other types, numbers of accounts and associated account attributes.

In the example illustrated in FIG. 14, four accounts of the payor 115 are analyzed (two checking accounts and two savings accounts) at FI 125 that hosts the computer 120 that has been accessed by the payor 115 to request electronic bill payment. The payor 115 also has a third checking account at another FI 135a, a fourth checking account at another FI 135b, and a credit card account at FI 135c. Thus, the bill pay system 126 configured according to embodiments retrieved or received data 122, 132 of four checking accounts, two savings accounts and a credit card account from multiple, different FIs using, for example, a FMS 116 for data of accounts not hosted by the FI.

Figure 15:
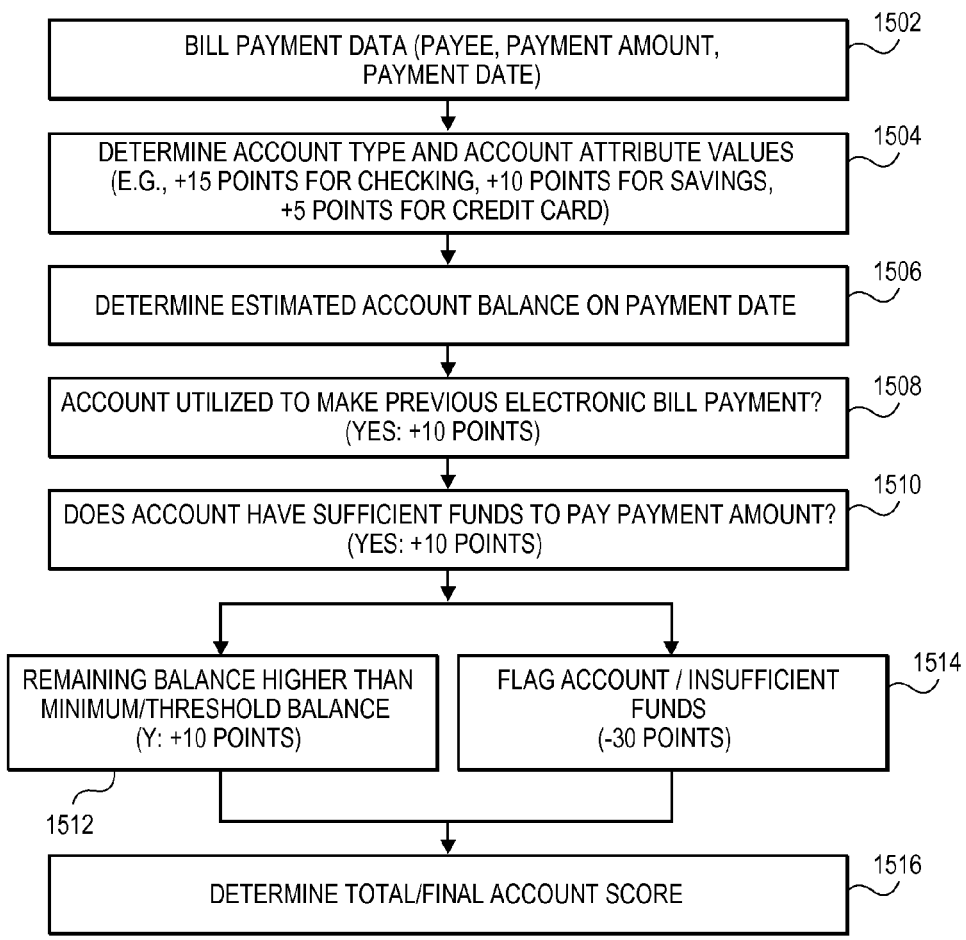
FIG. 15 is a flow diagram illustrating one example of how embodiments may be implemented to generate account scores based at least in part upon account attributes.
Figure 16:
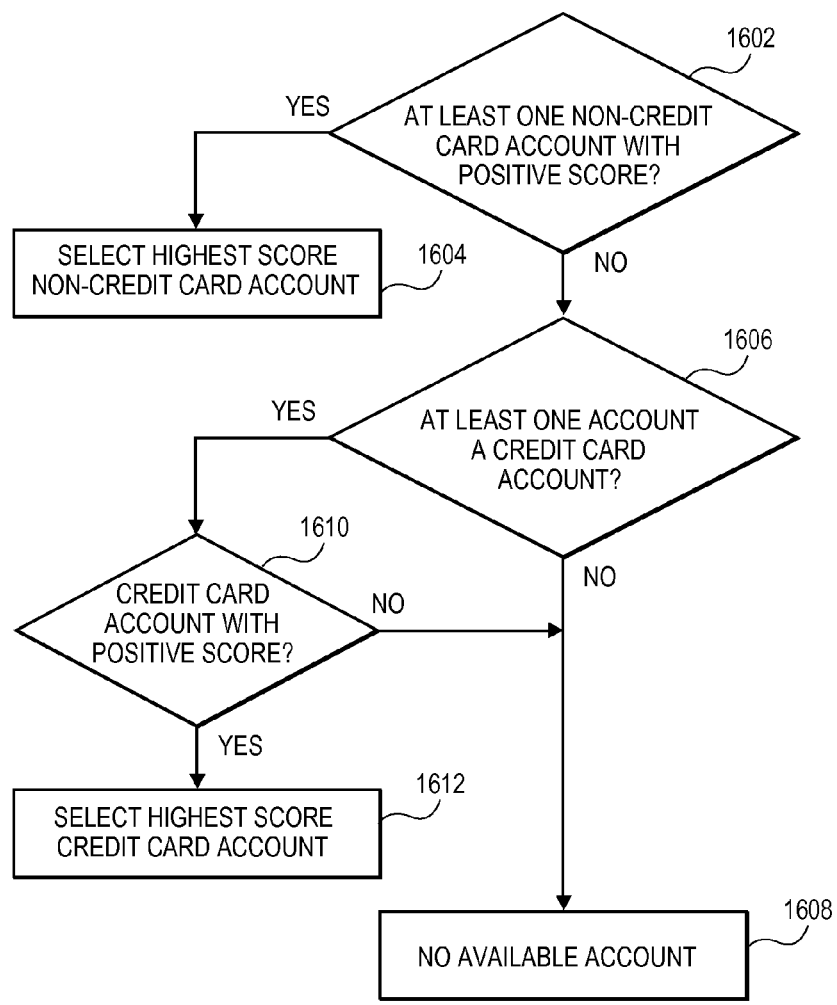
FIG. 16 is a flow diagram illustrating one example of how embodiments may be implemented to determine whether an electronic bill should be paid with a credit card.

FIGS. 15-16 illustrate examples of how account attributes 1305 are associated with respective values that contribute to a score. In the illustrated embodiment, pre-determined values are assigned to account attributes 1305, and the values for each account attribute 1305 applicable to respective accounts 121, 131 are summed to determine a final score 1310 for each account.

In the embodiment illustrated in FIG. 15, for each account being analyzed, the ranking engine 620 determines account attributes 1305 including account type, whether an account was used before by the payor 115 for electronic bill payment, current funds in the account, if the balance of the account after the payment would be greater than a pre-determined minimum balance. These account attributes 1305 are assigned respective values or score components.

In the illustrated embodiment, electronic bill payment data 510 (payee, payment amount and payment date) is entered or selected by the payor 115 at step 1502 as described above, and this bill payment data 510 is used for processing of each account 121, 131 during subsequent steps to determine a total or final score 1310 for each account based on the respective values of their account attributes 1305.

For example, at step 1504, the bill pay system 126, e.g., the ranking engine 620, determines the type of account for each of the accounts. In the illustrated embodiment, priority or more weight is given to checking accounts compared to savings accounts, and priority or more weight is given to checking and savings accounts compared to credit card accounts such that the ranking engine 620 assigns a value of (+15) to a checking account, a value of (+10) to a savings account, and a value of (+5) to a credit card account.

At step 1506, the bill pay system 126, e.g., the cashflow engine 620, calculates or determines the estimated or projected balances 808 on the payment date 510c (or other pre-determined date) for each account as discussed above. For this purpose, the cashflow engine 610 may consider the current balance of an account, incoming cashflows 802 such as periodic paycheck deposits, and outgoing cashflows 804 such as scheduled payments that are to be paid from an account.

At step 1508, the bill pay system 126, e.g., the ranking engine 620, analyzes an account attribute 1305 of whether the account was used to make previous electronic bill payments. If so, then the ranking engine 620 assigns a value of (+10) to that account. If not, then the value remains unchanged (as shown in FIG. 15), or a negative value can be assigned to that account by the ranking engine 620.

At step 1510, the ranking engine 620 determines whether an account has sufficient funds for the payment amount 510b on the payment date 510c. If so, then at step 1512, the ranking engine 620 assigns a value of (+10). If not, at step 1514, then no value is assigned or a negative value is assigned (e.g., a negative value of (−30) as shown in FIG. 15), and the account is flagged by the ranking engine 620 as having insufficient funds. According to one embodiment, a flagged account is not eligible to be utilized for the electronic bill payment. At step 1516, the positive and/or negative values are added to determine a final score 1310. FIG. 14 generally illustrates account scores 1310 generated for various accounts by the ranking engine 620.

For example, using the values shown in FIG. 15, a checking account (+15) that was previously used before for electronic bill payment (+10) and that has sufficient funds to pay the payment amount (+10) while not falling below a minimum balance or balance warning threshold (+10) would result in a final score of +45, whereas a savings account (+10) that was not previously used before for electronic bill payment (0) and that has sufficient funds for the payment amount (+10) but with the result that the savings account balance would fall below a minimum balance or balance warning threshold (0) would result in a final score of +20. Thus, when comparing these two accounts, the ranking engine 620 would select the checking account before the savings account as a result of the checking account's higher final score 1310.

FIG. 16 illustrates another example of how embodiments may be implemented in which the account considered for electronic bill payment also includes a credit card account. Account attributes 1305 and associated values that may apply to a credit card account include, but are not limited to, an interest rate or Annual Percentage Rate (APR) charged by the issuer to the user, current credit card balance, available credit, amount of a late fee charged by the issuer, rewards points or rewards programs for use of a credit card.

For example, a value associated with an interest rate or APR would be higher or more favorable for credit card accounts that charge lower rates. A value associated with a current credit card balance would be higher or more favorable for lower balances. A value associated with available credit would be higher or more favorable with higher amounts of available credit. Values associated with late fees would be higher or more favorable if there would be no late fee charged or if the late fee is lower than a late fee charged by another credit card issuer, and values associated with rewards points or rewards programs would be higher or more favorable if the payor 115 is near a point milestone for a new reward or if the user has utilize the credit card before such that the user already has a pre-determined minimum number of points, thus demonstrating repeat or frequent use of the credit card by the payor 115.

According to one embodiment, the ranking engine 620 values give preference to use of non-credit card account over use of a credit card for electronic bill payment, e.g., in order to eliminate or minimize expenses incurred by the payor 115 in the form of interest charged by the credit card issuer. Thus, at step 1602, the ranking engine 620 determines if there is at least one account (which is not a credit card) that has positive score 1310 or a score 1310 greater than a pre-determined minimum score, e.g., as determined based upon the method 1500 described above with reference to FIG. 15 or another method involving other account attributes 1305. If so, then at step 1604, the ranking engine 620 selects that account 1310 to be presented to the payor 115 for electronic bill payment. If not, then at 1606, the ranking engine 620 determines whether at least one of the accounts is a credit card. If there is no credit card account, then at 1608, the ranking engine 620 determines that there is no available account with funds to be used for the electronic bill payment and generates an insufficient funds warning. If there is a credit card account available, then at step 1610, the ranking engine 620 determines if any of the credit card accounts have a positive score. If not, the ranking engine 620 generates an insufficient funds warning and no account is selected. If so, then at 1612, the ranking engine 620 selects the credit card with the highest score 1310 or a score 1310 greater than a pre-determined minimum score.

For example, continuing with the embodiment illustrated in FIG. 15, the ranking engine 620 analysis may involve a checking account (+15) that was not previously used before for electronic bill payment (0) and that has sufficient funds to pay the payment amount (+10) with the result that the account balance would fall below a minimum balance or balance warning threshold (0), thus resulting in a final score 1310 of +25. In this case, even if a credit card account were available for the bill payment, the checking account would be selected by the ranking engine 620 instead, even if the credit card account had a positive score or score higher than the +25 score of the checking account.

As another example, the ranking engine 620 analysis may involve a savings account (+10) that was previously used before for electronic bill payment (+10) but the savings account does not have sufficient funds for the payment amount (−30). In this case, the savings account has a negative score of (−10) and thus would not be selected by the ranking engine 620. If there is no other account that can be considered (e.g., other accounts also have negative scores), then the ranking engine 620 generates an insufficient funds or other suitable message. However, if the accounts also include one or more credit card accounts, then the ranking engine 620 proceeds to analyze the credit card accounts. For example, based on the values shown in FIG. 15, there may be a credit card account (+5) that was not used before for electronic bill payment (0) and that has a balance or sufficient credit (+10) to for the payment amount, resulting in a credit card score of (+15). Thus, since there are no non-credit card account options, the credit card account would be selected by the ranking engine 620. It will be understood that the account attributes 1305 analyzed for credit card accounts may vary from account attributes 1305 analyzed for checking and savings accounts, and that the above examples are provided to illustrate how embodiments may be implemented to give priority to positive scoring non-credit card accounts, and utilizing a positive scoring credit card account only if there are no other positive scoring non-credit card accounts.

For example, assuming the ranking engine 620 determines that a positive scoring credit card account is to be utilized since there are no positive scoring non-credit card accounts, the ranking engine 620 may analyze multiple credit card accounts to determine which credit card account should be utilized for the electronic bill payment. The credit card account attributes 1305 may involve APR and available balance, and the score for one credit card account may be (+25) whereas the score for another credit card account may be (+10) such that the higher scoring credit card account would be selected by the ranking engine 620.

Thus, FIGS. 6-16 illustrate various embodiments involving an intelligent account selection system 600 including a cashflow engine 610 and a ranking engine 620 for scoring various accounts 121, 131 that may be candidate accounts for payment of the payment amount 510*b* on the payment date 510*c* to the payee entered or selected by the payor 115 It will be understood that embodiments may involve various types of numbers of accounts 121, 131, each of which may have different account attributes 1305, and that values assigned to account attributes 1305 may vary and be selected by the FI 120 or host of the bill pay system 126 depending on the importance of each attribute 1305 or relative importance relative to other attributes 1305.

Referring again to FIG. 3, having described how bill payment system 126 embodiments, including embodiments involving the cashflow engine 610 and ranking engine 620, generate scores 1310 for accounts 121, 131, and then select one or more accounts 121, 131, at step 314, the bill pay system 126 presents the selected account as a candidate account form which the payment amount will be paid. At step 316, the payor 115 may confirm that the account selected by the bill pay system 126 will be used, or reject that selection and select another account thus disregarding or overriding the results generated by the bill pay system 126. According to another embodiment, the bill pay system 126 selects multiple accounts (e.g., accounts having positive scores), and allows the payor 115 to select from the multiple accounts selected by the bill pay system 126.

At step 318, the bill pay system 126 then schedules or processes the electronic bill payment in the payment amount 510b, on the payment date 510c and to the identified payee 510a using the confirmed or user-selected account.

Embodiments described above involve the bill pay system 126 analyzing and scoring accounts 121, 131 and selecting an account that is presented or displayed to the payor 115 so that the payor 115 can then confirm that selected account or select an account for the electronic bill payment.

Figure 17:
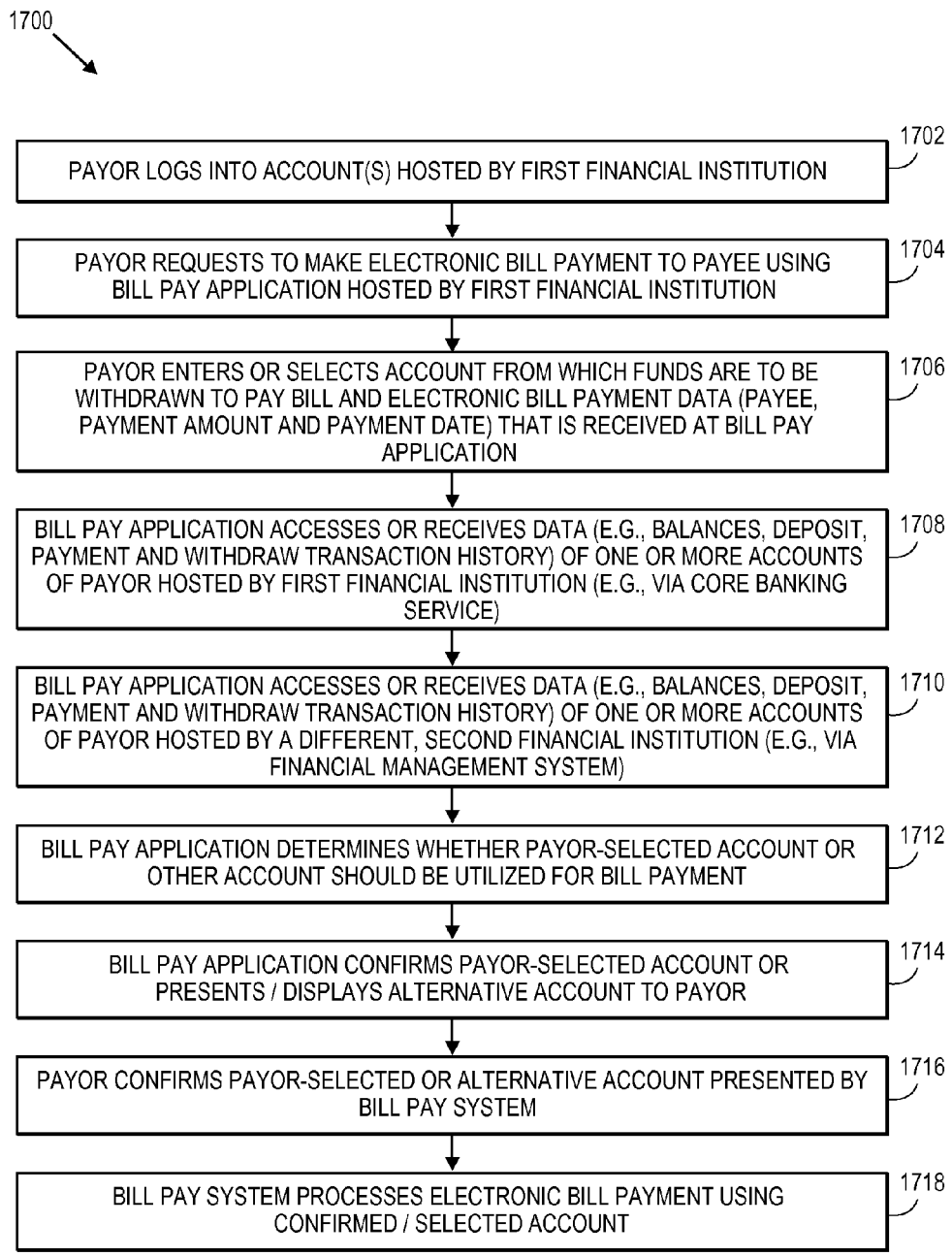
FIG. 17 is a flow diagram illustrating another embodiment in which a payor initially selects an account for an electronic bill payment and embodiments are utilized to analyze the payor-selected account, confirm the payor-selected account or present alternative account choices.

Referring to FIG. 17, according to another embodiment, a method 1700 for intelligent and automated confirmation of a user-selected account to be utilized for an electronic bill payment and that may be implemented using system components shown in FIGS. 1-2 comprises, at 1702, the payor 115 logging into an account 121 hosted by the FI computer 120 that will be utilized to process the electronic bill payment using bill payment system 126 configured according to embodiments and step 1704, the payor 115 requesting to make an electronic bill payment to a payee using the bill pay system 126. At step 1706, the payor 115 enters or selects electronic bill payment data 510 (payee, payment date, payment amount) as discussed above with reference to FIG. 3, and also enters or selects, according to this embodiment, a particular account 121, 131 to be utilized as the funding source. This is in contrast to embodiments described above in which the payor 115 did not enter or select the account to be utilized.

At step 1708, the bill pay system 126 accesses or receives account data 122, 132 (e.g., balances, deposit, payment and withdraw transaction history) of the accounts selected by the payor 115, and at step 1710, accesses or receives account data 122, 132 (e.g., balances, deposit, payment and withdraw transaction history) of one or more accounts 121, 131 of payor 115, and then determines whether user-selected account or other account should be utilized for bill payment at step 1712 using the scoring methods and cashflow engine 610 and ranking engine 620 described above. At step 1714, assuming the bill pay system 126 determines that the user-selected account has a positive score 1310, the user-selected account is confirmed by the bill pay system 126, or the bill pay system 126 may present alternative account choices that also have positive scores 1310. At step 1716, the payor 115 confirms the account that was previously selected by the payor 115 or decides to instead utilize an alternative account with a positive score 1310 identified by the bill pay system 126, and at step 1718, the bill pay system 126 schedules or processes the electronic bill payment using confirmed or alternative account.

Thus, it will be understood that embodiments may be utilized to present candidate accounts to the payor 115 who has not selected an account and has instead only entered electronic bill payment data 510 such as payee, payment amount and payment date, or that embodiments may be utilized to confirm or verify a user-selected account and/or present alternative accounts to the payor 115. In this regard, the account that is eventually utilized for the electronic bill payment system may be an account hosted by the first FI 120 or an account hosted by a second or other FI 130, in which case the payor 115 would log into an account hosted by the second or other FI and schedule or process the electronic bill payment using that FI computer instead.

Figure 18:
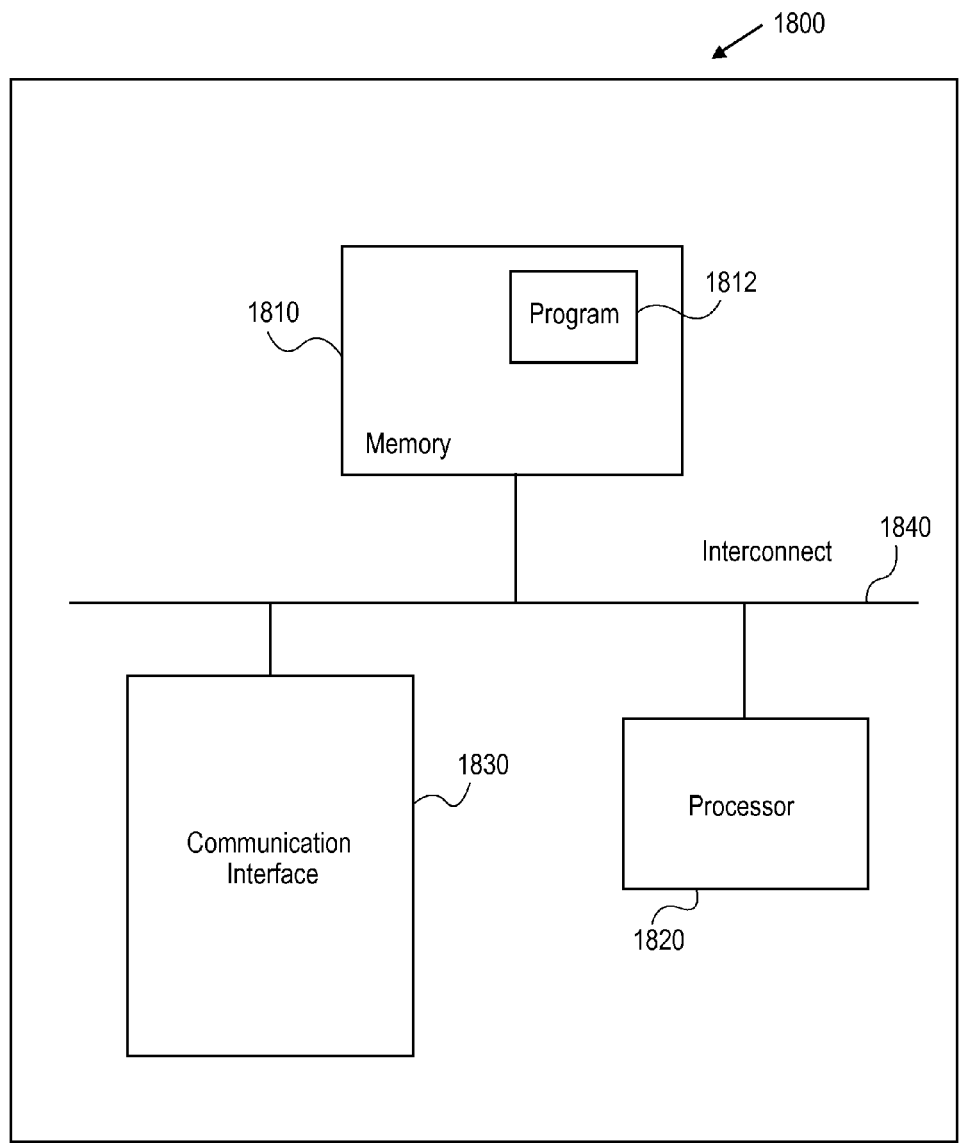
FIG. 18 is a block diagram of a computing apparatus or system in which various embodiments may be implemented or that may be utilized to execute various embodiments.

FIG. 18 generally illustrates certain components of a computing device 1800 that may be utilized to execute embodiments and that includes a memory 1810, program instructions 1812, a processor or controller 1820 to execute instructions 1812, a network or communications interface 1830, e.g., for communications with a network or interconnect 1840 between such components. The memory 1810 may be or include one or more of cache, RAM, ROM, SRAM, DRAM, RDRAM, EEPROM and other types of volatile or non-volatile memory capable of storing data. The processor unit 1820 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1840 may include a system bus, LDT, PCI, ISA, or other types of buses, and the communications or network interface may, for example, be an Ethernet interface, a Frame Relay interface, or other interface. The network interface 1830 may be configured to enable a system component to communicate with other system components across a network which may be a wireless or various other networks. It should be noted that one or more components of computing device 1800 may be located remotely and accessed via a network. Accordingly, the system configuration provided in FIG. 18 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1820 performs steps or executes program instructions 1812 within memory 1810 and/or embodied on the carrier to implement method embodiments.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while certain embodiments are described with reference to accounts hosted by two different FIs, embodiments may involve analysis of accounts of three, four, and other numbers of FIs, each of which may host one or multiple accounts of the user. Further, it will be understood that the values or point components or weighting assigned to various account attributes may vary and be selected depending on the relative importance of such attributes. Moreover, analyses may involve various numbers of account attributes. Thus, while certain embodiments are described with reference to certain attributes, it will be understood that embodiments may involve various types, numbers and combinations of such attributes in order to generate scores for respective accounts. Moreover, embodiments may involve analysis of non-credit card accounts only, credit card accounts only, or both non-credit card and credit card accounts. Further, while certain embodiments are described with reference to non-credit card accounts being viewed more favorably compared to credit card accounts, embodiments are not so limited.

Moreover, while certain embodiments are described with reference to selecting an account from accounts hosted by different FIs, embodiments may also be utilized or configured to analyze multiple accounts of a particular FI and to select one or more accounts of the multiple accounts for presentation to the user as candidate accounts, or to confirm an account selected by the user or present alternatives to the user following selection of an account by the user.

Additionally, while embodiments are described with reference to payment from a single account, the ranking engine can be configured to select multiple accounts (e.g., accounts with multiple scores) so that the payor can pay portions of the payment amount from the multiple accounts. For example, the payment amount can be divided equally among multiple accounts that have positive final scores. Further, according to another embodiment, the ranking engine can be configured to select multiple accounts (e.g., accounts with multiple scores) so that the payor can pay portions of the payment amount from the multiple accounts while maximizing the amount of interest paid from the accounts. For example, the ranking engine can be configured to select a first account having a positive score and a low interest rate, and to pay all or most of the payment amount from the low-earning account, and then to pay any remaining balance of the payment amount from higher interest rate accounts, thus maintaining a higher balance for higher earning accounts, while making payments from lower earning accounts, thereby maximizing interest earnings while making payments from suitable accounts.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for selecting an account to be utilized for an electronic bill payment to a payee, the method comprising:
    a cashflow engine of a computer of a first financial institution receiving data of a first account of a payor hosted by the first financial institution and data of a second account of the payor hosted by a different, second financial institution, the first and second account data comprising respective current balance and transaction history data,
    receiving electronic bill payment data comprising a payment date, the payor logging into a website of the first financial institution computer and entering or selecting the payment date, and
    determining respective estimated balances of the first and second accounts on respective pre-determined dates based at least in part upon respective current balances and transaction histories of respective first and second accounts; and
    a ranking engine of the first financial institution computer receiving the respective estimated balances on the pre-determined dates generated by the cashflow engine,
        generating respective scores for the first and second accounts based at least in part upon the respective estimated balances on the pre-determined dates and respective attributes of the first and second accounts,
        performing a comparison of the generated scores; and
        selecting at least one of the first and second accounts as a source of funds for the electronic bill payment to the payee based at least in part upon the comparison.

2. The method of claim 1, the cashflow engine receiving respective data of a plurality of payor accounts hosted by the first financial institution and selecting one of the plurality of accounts for the electronic bill payment.

3. The method of claim 1, the second account data comprising a balance and transaction history, the ranking engine selecting the first account for the electronic bill payment based at least in part upon a generated score of the generated respective scores being based at least in part upon at least one of an insufficient balance and the transaction history of the second account.

4. The method of claim 1, the first account data comprising a balance and transaction history, the ranking engine selecting the second account for the electronic bill payment based at least in part upon a generated score of the generated respective scores being based at least in part upon at least one of an insufficient balance and the transaction history of the first account.

5. The method of claim 1, the cashflow engine receiving the second account data from a financial management system that is operable to receive respective account data from respective accounts hosted by respective different financial institutions.

6. The method of claim 5, the financial management system being hosted by the first financial institution computer, the financial management system being in communication with respective computers of respective different financial institutions through respective networks.

7. The method of claim 5, the financial management system being hosted by a computer utilized by the payor, the financial management system being in communication with respective computers of respective different financial institutions and the first financial institution computer through respective networks.

8. The method of claim 1, further comprising the cashflow engine receiving data of a plurality of other accounts hosted by respective other financial institutions, at least one of the plurality of other accounts being selected by the ranking engine for the electronic bill payment.

9. The method of claim 8, the cashflow engine receiving data of the plurality of other accounts from a financial management system that is operable to receive respective account data from respective accounts hosted by respective different financial institutions.

10. The method of claim 1, further comprising:
    displaying the account selected by the ranking engine to the payor; and
    receiving an indication from the payor whether the selected account should be utilized for the electronic bill payment.

11. The method of claim 10, the payor confirming that the account selected by the ranking engine is to be utilized, the method further comprising completing the electronic bill payment using the selected account.

12. The method of claim 10, the payor rejecting the account selected by the ranking engine and selecting a different account, the method further comprising completing the electronic bill payment using the account selected by the payor.

13. The method of claim 10, the cashflow engine receiving the data of the first account from a core banking service and receiving the data of the second account from a financial management system hosted or accessed by the first financial institution computer and operable to receive or collect data of the second account hosted by the second financial institution through a network.

14. The method of claim 1, at least one of the pre-determined dates comprising the payment date of the electronic bill payment selected or entered by payor.

15. The method of claim 1, at least one of the pre-determined dates comprising a pre-determined number of days before or after the payment date selected or entered by the payor.

16. The method of claim 1, the cashflow engine determining respective estimated balances on respective pre-determined dates based at least in part upon the frequency and amounts of deposits and withdraws or payments from respective first and second accounts.

17. The method of claim 1, the account attributes comprising a type of account.

18. The method of claim 17, wherein a checking account is scored more favorably than a savings account, and the checking and savings accounts are scored more favorably than a credit card account.

19. The method of claim 1, the account attributes comprising whether the payor previously used an account for electronic bill pay to the payee, prior use of the account for electronic bill payment to the payee being scored more favorably than less frequent or a first time use of the account for electronic bill payment to the payee.

20. The method of claim 1, wherein at least one of the first and second accounts is a credit card account, the account attributes comprising at least one of:
   a current balance of the credit card account;
   an interest rate on the credit card account;
   charged to the payor credit card balance; and
   an interest rate of the credit card account.

21. The method of claim 1, wherein at least one of the first and second accounts is a credit card account and a non-credit card account having a score exceeding a pre-determined minimum score is selected before a credit card account having a score exceeding the pre-determined score.

22. A computer-implemented method for selecting an account to be utilized for an electronic bill payment to a payee, the method comprising:
   a cashflow engine of a computer of a first financial institution receiving data of one or more accounts of the payor hosted by the first financial institution, and data of one or more accounts of the payor hosted by a different, second financial institution;
   the cashflow engine determining respective estimated balances of the respective accounts on a pre-determined date;
   a ranking engine of the first financial institution computer generating respective scores for the respective accounts based at least in part upon the respective estimated balances on the pre-determined date and respective attributes of the first and second accounts;
   the ranking engine performing a comparison of the generated scores; and
   the ranking engine selecting an account of the first financial institution or the second financial institution based at least in part upon the comparison, the selected account being presented to the payor as an option for the electronic bill payment to the payee.

23. The method of claim 22, the cashflow engine determining respective estimated balances based at least in part upon respective current balances and transaction histories of respective accounts.

24. The method of claim 22, the cashflow engine receiving data of the one or more accounts hosted by the second financial institution from a financial management system that is operable to receive respective account data from respective accounts hosted by respective different financial institutions.

25. The method of claim 22, the cashflow engine receiving account data from a core banking service and from a financial management system operable to receive or collect data of the one or more accounts of the second financial institution through a network.

26. The method of claim 22, the account attributes comprising at least one of:
   a balance of an account after processing of the electronic bill payment;
   a type of account; and
   whether an account was previously used by the payor for electronic bill payment to the payee.

27. The method of claim 26, wherein the ranking engine scores a checking account more favorably than a savings account, and the checking and savings accounts are scored more favorably than a credit card account.

28. The method of claim 26, wherein the ranking engine scores prior use of the account for electronic bill payment to the payee more favorably than less frequent or a first time use of the account for electronic bill payment to the payee.

29. The method of claim 26, wherein at least one of the first and second accounts is a credit card account, the account attributes comprising at least one of:
   a current balance of the credit card account;
   an interest rate on the credit card account;
   charged to the payor credit card balance; and
   an interest rate of the credit card account.

30. The method of claim 22, wherein the payor has selected an account for the electronic bill payment, the method further comprising the ranking engine presenting the payor with an option of utilizing a different, account for the electronic bill payment.

31. The method of claim 1, the generated respective scores for the first and second accounts being based at least in part upon the respective estimated balances of the first and second accounts on respective pre-determined dates and respective attributes of the first and second accounts.

32. The method of claim 31, the respective pre-determined dates comprising:
   a first date that is a pre-determined number of days before the payment date of the electronic bill payment: and
   a second date that is a pre-determined number of days after the payment date.

33. The method of claim 22, the pre-determined date comprising a payment date of the electronic bill payment.

34. The method of claim 22, the pre-determined date comprising a pre-determined number of days before or after a payment date of the electronic bill payment.

35. The method of claim 22, the cashflow engine determining respective estimated balances of the respective accounts on respective pre-determined dates, the respective scores for the first and second accounts being based at least in part upon the respective estimated balances on the pre-determined dates and respective attributes of the first and second accounts.

36. The method of claim 35, the pre-determined dates comprising:
   a first date that is a pre-determined number of days before a payment date of the electronic bill payment; and
   a second date that is the a pre-determined number of days after the payment date.

37. The method of claim 22, the cashflow engine receiving the pre-determined date from the ranking engine.

38. The method of claim 22, the cashflow engine receiving the pre-determined date entered or selected by the payor.

* * * * *